(12) United States Patent
Maeda et al.

(10) Patent No.: US 9,641,461 B2
(45) Date of Patent: May 2, 2017

(54) RELAY DEVICE, COMMUNICATION SYSTEM, AND COMMUNICATION METHOD

(71) Applicant: FUJITSU LIMITED, Kawasaki-shi, Kanagawa (JP)

(72) Inventors: Takuya Maeda, Kanazawa (JP); Shuichi Muso, Awara (JP); Norikazu Hikimochi, Kanazawa (JP)

(73) Assignee: FUJITSU LIMITED, Kawasaki (JP)

( * ) Notice: Subject to any disclaimer, the term of this patent is extended or adjusted under 35 U.S.C. 154(b) by 319 days.

(21) Appl. No.: 14/576,523

(22) Filed: Dec. 19, 2014

(65) Prior Publication Data

US 2015/0222558 A1   Aug. 6, 2015

(30) Foreign Application Priority Data

Jan. 31, 2014 (JP) ................................. 2014-017397

(51) Int. Cl.
*H04L 12/50* (2006.01)
*H04L 12/939* (2013.01)
*H04L 12/861* (2013.01)

(52) U.S. Cl.
CPC ........ *H04L 49/555* (2013.01); *H04L 49/9057* (2013.01)

(58) Field of Classification Search
CPC .......................... H04L 49/555; H04L 49/9057
USPC .................. 370/412, 413, 428, 389
See application file for complete search history.

(56) References Cited

U.S. PATENT DOCUMENTS

| | | | |
|---|---|---|---|
| 6,026,093 A | 2/2000 | Bellaton et al. | |
| 2003/0103527 A1* | 6/2003 | Beser | H04L 12/2801 370/468 |
| 2003/0142823 A1 | 7/2003 | Swander et al. | |
| 2004/0103282 A1* | 5/2004 | Meier | G06Q 20/3674 713/171 |

FOREIGN PATENT DOCUMENTS

| | | |
|---|---|---|
| JP | 11-177627 | 7/1999 |
| JP | 2001-244975 | 9/2001 |
| JP | 2003-244233 | 8/2003 |

* cited by examiner

*Primary Examiner* — Dang Ton
(74) *Attorney, Agent, or Firm* — Staas & Halsey LLP

(57) ABSTRACT

A communication method executed by a processor included in a relay device, the communication method includes receiving a target packet among a plurality of segmented packets generated by dividing a transmission packet, the plurality of segmented packets including a same identifier as that of the transmission packet; storing the target packet into a memory, when no error is detected from the target packet; discarding one or more packets stored in the memory and including a same identifier as that of the target packet, when an error is detected from the target packet; generating a discard request including an identifier of the transmission packet, and information requesting to discard a packet including the identifier, when the discarded one or more packets do not include a head packet among the plurality of segmented packets; and transmitting the discard request to a transmission destination to which the head packet is transmitted.

14 Claims, 22 Drawing Sheets

| No | PACKET ID | IP ADDRESS | | OFFSET | LAST FLAG | ERROR |
| --- | --- | --- | --- | --- | --- | --- |
| | | SOURCE | DESTINATION | | | |
| 1 | aaaa | AA | BB | 0 | 1 | 0 |
| 2 | aaaa | AA | BB | xxxx | 1 | 0 |
| 3 | aaaa | AA | BB | yyyy | 1 | 0 |
| ... | ... | ... | ... | ... | ... | ... |
| 9 | aaaa | AA | BB | zzzz | 0 | 1 |
| ... | ... | ... | ... | ... | ... | ... |
| n | bbbb | CC | DD | 0 | 1 | 0 |

41b

| No | PACKET ID | IP ADDRESS | | OFFSET | LAST FLAG | ERROR |
| --- | --- | --- | --- | --- | --- | --- |
| | | SOURCE | DESTINATION | | | |
| 1 | aaaa | AA | BB | 0 | 1 | 0 |
| 2 | aaaa | AA | BB | xxxx | 1 | 0 |
| ... | ... | ... | ... | ... | ... | ... |
| 6 | aaaa | AA | BB | 65528 | 0 | 1 |

FIG. 10

| No | IP ADDRESS (Dst) | CARD | PORT |
|---|---|---|---|
| 1 | BB | x | n |
| 2 | DD | y | m |

FIG. 13

| No | PACKET ID | DISCARD START STATE | DISCARD STATE |
|---|---|---|---|
| 1 | aaaa | 0 | 0 |
| 2 | bbbb | 1 | 1 |
| 3 | cccc | 1 | 0 |
| ⋮ | | | |
| n | | | |

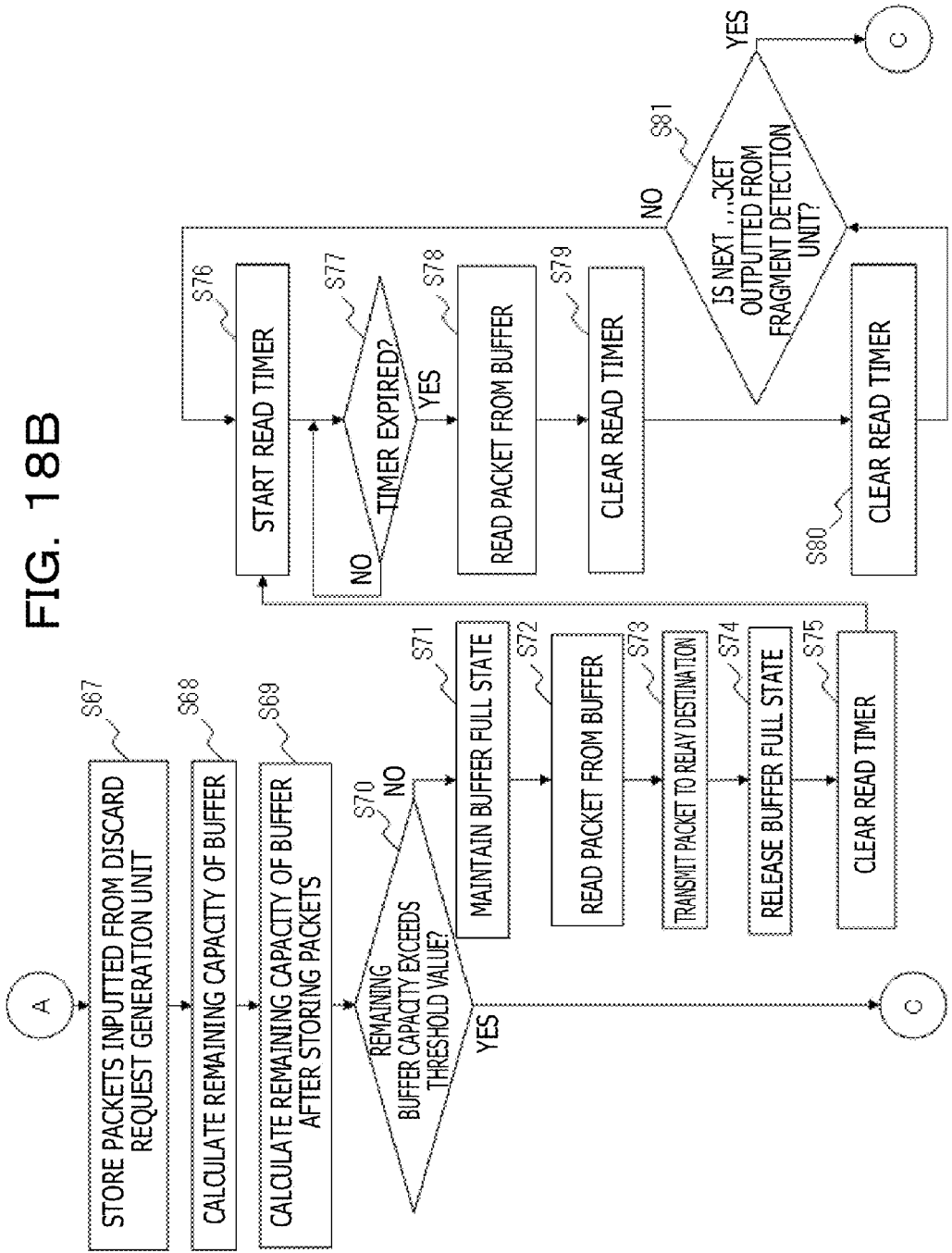

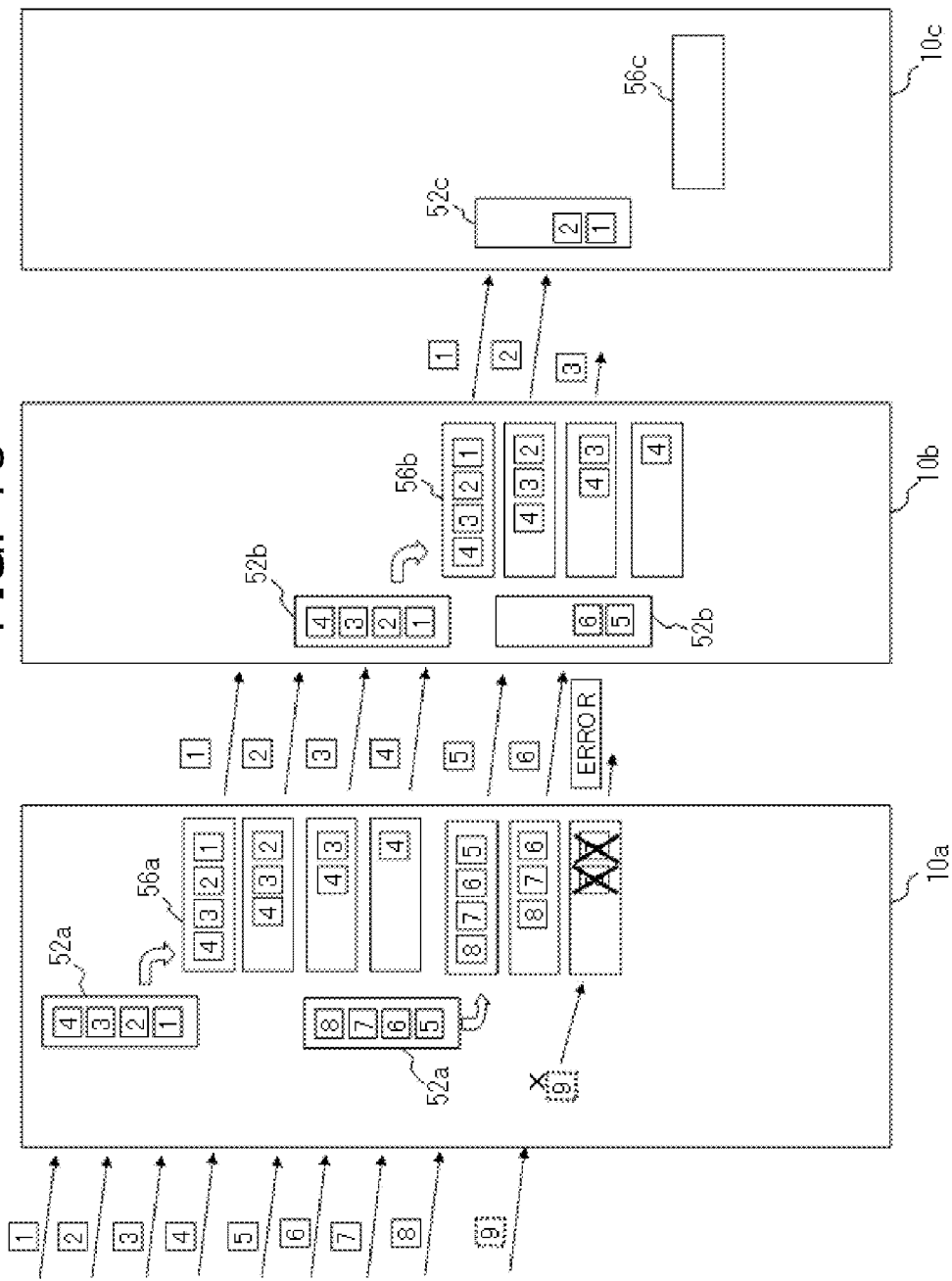

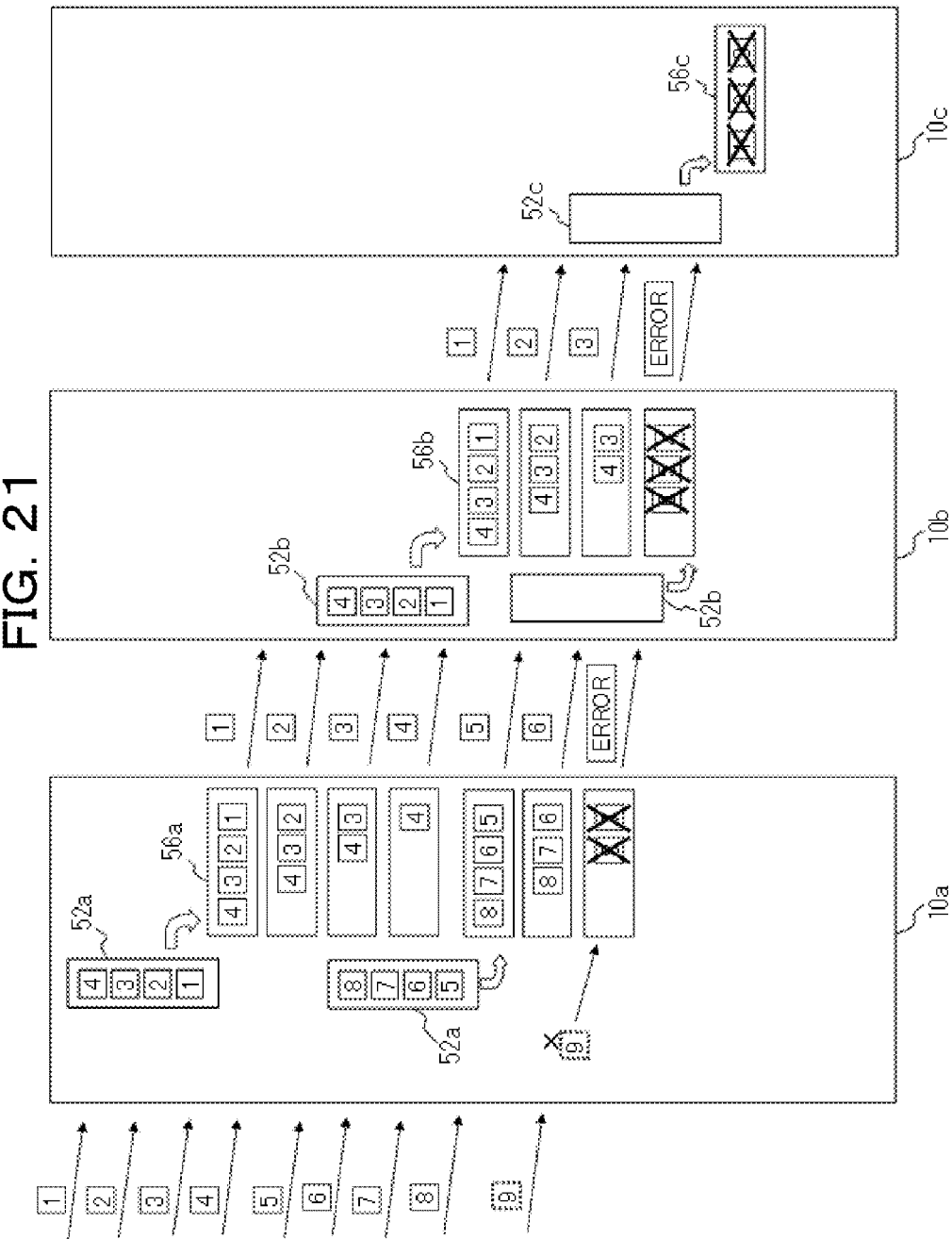

RELAY DEVICE, COMMUNICATION SYSTEM, AND COMMUNICATION METHOD

CROSS-REFERENCE TO RELATED APPLICATION

This application is based upon and claims the benefit of priority of the prior Japanese Patent Application No. 2014-017397, filed on Jan. 31, 2014, the entire contents of which are incorporated herein by reference.

FIELD

The embodiments discussed herein are related to communications performed among multiple devices.

BACKGROUND

In recent years, improvement in handling the jumbo packets is demanded to address increase in the speed of communication devices and increase in the data amount transmitted and received in a network. Use of the jumbo packet is advantageous in that large volume of data can be processed in one packet. However, a prolonged processing of the jumbo packet may cause a delay in processing of other packets. Thus, when realizing co-existence of a service desired to possess real time property such as an Internet Protocol (IP) telephone and a service handling the jumbo packet in the same network, the jumbo packet is fragmented. The jumbo packet is fragmented when the size of a packet transferable to a destination network of the jumbo packet is smaller than the size of the jumbo packet. By fragmenting, multiple fragment packets are generated from one jumbo packet. Then, the generated multiple fragment packets are transmitted to the destination separately. A destination device restores the transmitted jumbo packet from the received multiple fragment packets. Thereafter, the destination device performs processing by using the restored jumbo packet.

As a related art, a mechanism is disclosed that records a data unit as a transmission target when performing transmission processing of one fragment generated from the data unit. The mechanism includes a queue for arranging fragments for transmission. When the queue exceeds a transmission capacity, the mechanism removes a data unit not recorded as the transmission target. As a related art, for example, Japanese Laid-open Patent Publication No. 11-177627 is disclosed. Also, a method is disclosed that fragments a packet including an Internet Key Exchange (IKE) payload exceeding a predetermined Maximum Transmission Unit (MTU) into packets smaller than the MTU. As a related art, for example, Japanese Laid-open Patent Publication No. 2003-244233 is disclosed.

It is assumed that a router, which has received a transmission packet transmitted from a transmission source device, fragments the transmission packet and transmits fragment packets to the destination. In this case, since the fragment packets are transmitted separately, some of the fragment packets generated from one transmission packet may be lost while being transferred. If any fragmented packet is lost while being transferred, the transmission packet might not be restored even if the other fragment packets reach the destination. Consequently, a device, which has received the fragment packets, determines that reception of the transmission packet has failed and discards the received fragment packets. That is, when one of fragmented packets is lost, the other fragment packets generated from the same transmission packet are not used. Thus, if the unused fragment packets are transmitted to the destination, communication efficiency between devices transmitting or receiving these fragment packets deteriorates.

Any of the disclosures described in documents cited as related arts is not effective in suppressing the deterioration of communication efficiency resulting from transfer processing of fragment packets not used due to missing of some of the fragment packets.

SUMMARY

According to an aspect of the invention, a communication method executed by a processor included in a relay device, the communication method includes receiving a target packet among a plurality of segmented packets generated by dividing a transmission packet, the plurality of segmented packets including a same identifier as that of the transmission packet; storing the target packet into a memory when no error is detected from the target packet among the plurality of segmented packets; discarding one or more packets stored in the memory by the storing and including a same identifier as that of the target packet when an error is detected from the target packet; generating a discard request including an identifier of the transmission packet, and information requesting to discard a packet including the identifier, when the discarded one or more packets do not include a head packet among the plurality of segmented packets; and transmitting the discard request to a transmission destination to which the head packet is transmitted.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an example of a fragment data table;

FIG. 10 is a diagram illustrating an example of a port table;

FIG. 13 is a diagram illustrating an example of a packet discard list;

FIG. 18B is a flow chart illustrating an operation example of the transmission processing unit in accordance with the second embodiment;

FIG. 19 is a diagram illustrating an example of processing in accordance with a modified example;

FIG. 21 illustrates an example of processing in accordance with the modified example.

DESCRIPTION OF EMBODIMENTS

Figure 1:
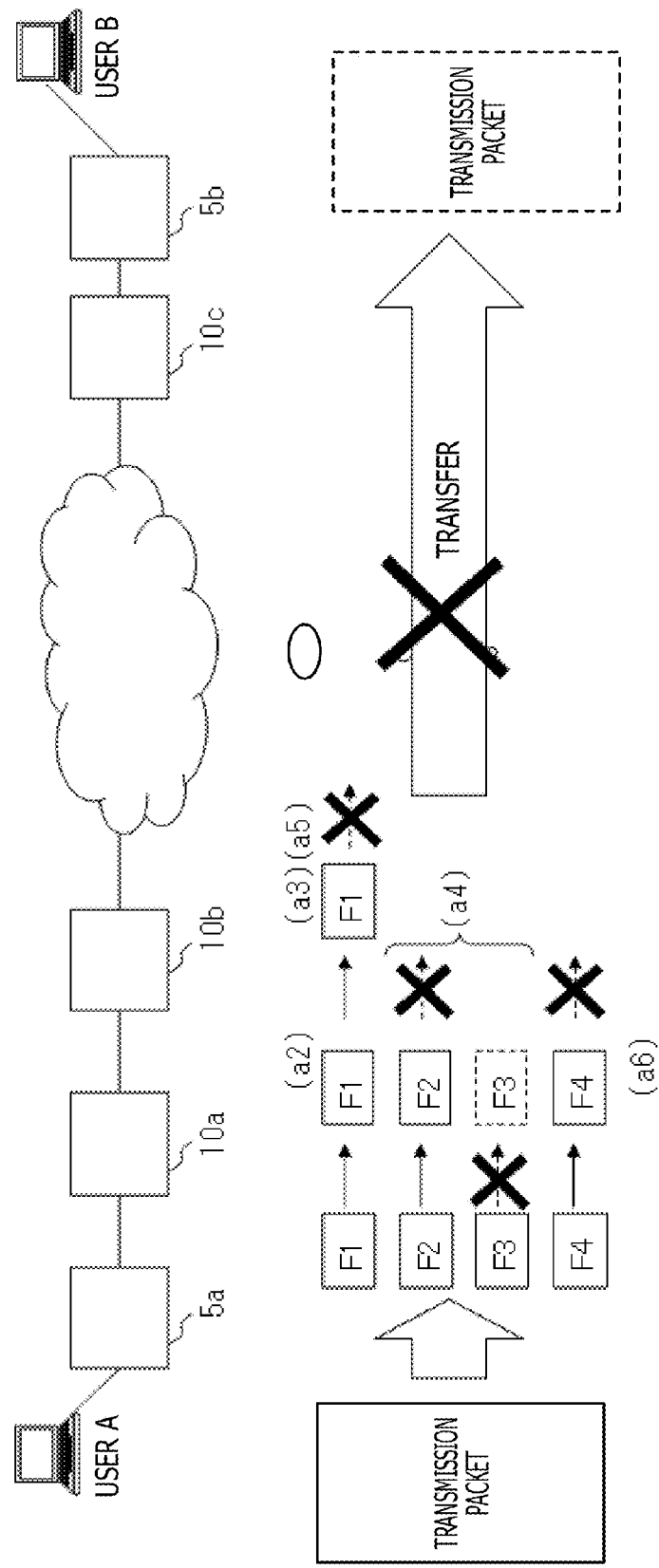
FIG. 1 is a diagram illustrating an example of relay processing in accordance with an embodiment.

FIG. 1 illustrates an example of relay processing in accordance with an embodiment. Hereinafter, a device for fragmenting a packet received from a user's terminal and restoring a transmission packet from fragment packets is referred to as "edge node". FIG. 1 illustrates an example of transmission processing in which a transmission packet transmitted by a user A is transmitted to a terminal used by a user B via edge nodes 5a and 5b, and multiple relay devices 10 (10a to 10c). For simplicity, FIG. 1 illustrates only relay devices on a path used for transmission and reception of a transmission packet and fragment packets (segmented packets) generated from the transmission packet.

(a1) Upon receiving a transmission packet transmitted from the user A's terminal, the edge node 5a identifies the size of the packet to determine whether the transmission packet is smaller than the jumbo packet. If the packet transmitted from the user A is a jumbo packet, the edge node 5a fragments the transmission packet transmitted from the user A. Here, the transmission packet is assumed to have been fragmented into fragment packets F1 to F4. Then, the edge node 5a assigns a same identifier as the transmission packet to each of the fragment packets F1 to F4. The edge node 5a transmits fragment packets F1 to F4 to a relay device 10a. Here, it is assumed that an error occurs to a fragment packet F3 in a path between relay devices 10a and 10b. It is assumed that the value of the identifier does not vary due to this error.

(a2) The relay device 10a checks for any error upon receiving a fragment packet F1. If no error is detected from the fragment packet F1, the relay device 10a stores the fragment packet F1 in a buffer. Next, upon receiving a fragment packet F2, the relay device 10a performs similar processing as the fragment packet F1. Here, the fragment packet F2 is assumed to also have been stored in the buffer of the relay device 10a.

(a3) The relay device 10a reads the fragment packet F1 from the buffer and transfers to the relay device 10b. The relay device 10b receives the fragment packet F1 from the relay device 10a and stores the fragment packet F1 into the buffer.

(a4) Then, the relay device 10a receives the fragment packet F3, and checks for any error in the fragment packet F3. Upon detecting occurrence of an error in the fragment packet F3 through the error checking, the relay device 10a acquires an identifier contained in the fragment packet F3 and discards the fragment packet F3.

Further, when fragment packets including the identifier same as the discarded fragment packet are stored in the buffer, the relay device 10a discards those fragment packets. Here, the fragment packet F2 having the same identifier as the fragment packet F3 which has turned a discard target through processing of the procedure (a2) is contained in the buffer. Thus, the relay device 10a deletes the fragment packet F2 from the buffer.

Now, the relay device 10a determines whether head data of the transmission packet is contained in the fragment packet to be deleted. The fragment packet F2 is not a fragment packet including the head data of the transmission packet. Thus, the relay device 10a determines that the transmission packet F1 including the head data of the transmission packet has been transferred to the other relay device 10. Then, the relay device 10a transmits, to a relay device 10b at the transfer destination, an identifier contained in the deleted fragment packet, together with a message including a request to delete fragment packets including the identifier. Hereinafter, the message requesting discard of the fragment packet is referred to as "discard request". Also, a fragment packet including head data of the transmission packet may be referred to as "head packet".

(a5) Upon receiving the discard request from the relay device 10a, the relay device 10b extracts an identifier included in the discard request. The relay device 10b determines whether a fragment packet including the extracted identifier is contained in the buffer. The relay device 10b has stored the fragment packet Fl in the buffer through processing of the procedure (a3). Therefore, upon receiving the discard request, the relay device 10b discards the fragment packet F1 stored in the buffer. Now, the relay device 10b determines whether the packet of the discard target is a head packet. Since the fragment packet F1 is the head packet, the relay device 10b does not generate the discard request.

(a6) Next, the relay device 10a is assumed to have received a fragment packet F4 from an edge node 5a. Here, through processing of the procedure (a4), the relay device 10a has acquired an identifier of a packet of the discard target. Thus, the relay device 10a determines whether the identifier of the packet of the discard target is contained in the fragment packet F4. Since the fragment packet F4 contains the identifier of the packet of the discard target, the relay device 10a discards the fragment packet F4.

Through the above processing, when an error is detected from the fragment packet F3, the fragment packets F1, F2, and F4 generated from a transmission packet same as the one used for generating the fragment packet F3 are discarded by relay devices 10a and 10b, the relay devices holding the fragment packets respectively. For this reason, fragment packets are not discarded due to failure of restoring the transmission packet from being transferred to a device other than relay devices 10a and 10b. Accordingly, the method according to the embodiment can suppress transmission and reception of packets of the discard target to the minimum, and thereby improve communication efficiency.

Figure 2:
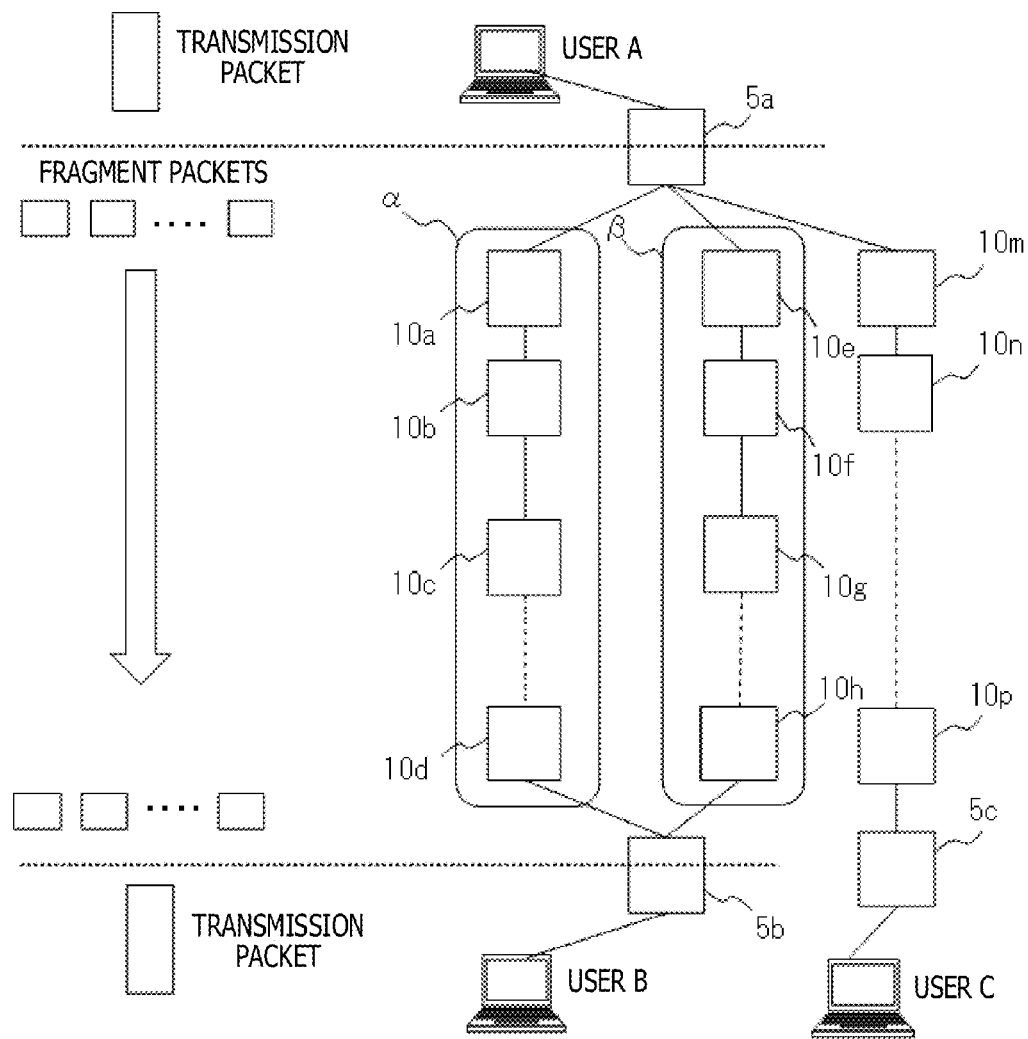
FIG. 2 is a diagram illustrating an example of a network.

FIG. 2 is a diagram illustrating an example of a network. Similarly with FIG. 1, for simplicity, FIG. 2 illustrates a path used for transfer of the transmission packet and fragment packets in the form of a linear network.

The edge node 5a generates fragment packets by fragmenting a transmission packet received from the user A and destined to the user B, and transmits fragment packets to a terminal used by the user B. Also, when a transmission packet destined to a user C is transmitted by the user A, the edge node 5a fragments the transmission packet and then transmits fragment packets to a terminal used by the user C. Paths in the network may be neither redundant or not. In the example of FIG. 2, a path between the user A and the user B is made redundant so as to allow use of paths α and β. The path a is a path extending from the edge node 5a to the edge node 5b via relay devices 10a to 10d. The path β is a path extending from the edge node 5a to the edge node 5b via relay devices 10e to 10h.

Figure 3:
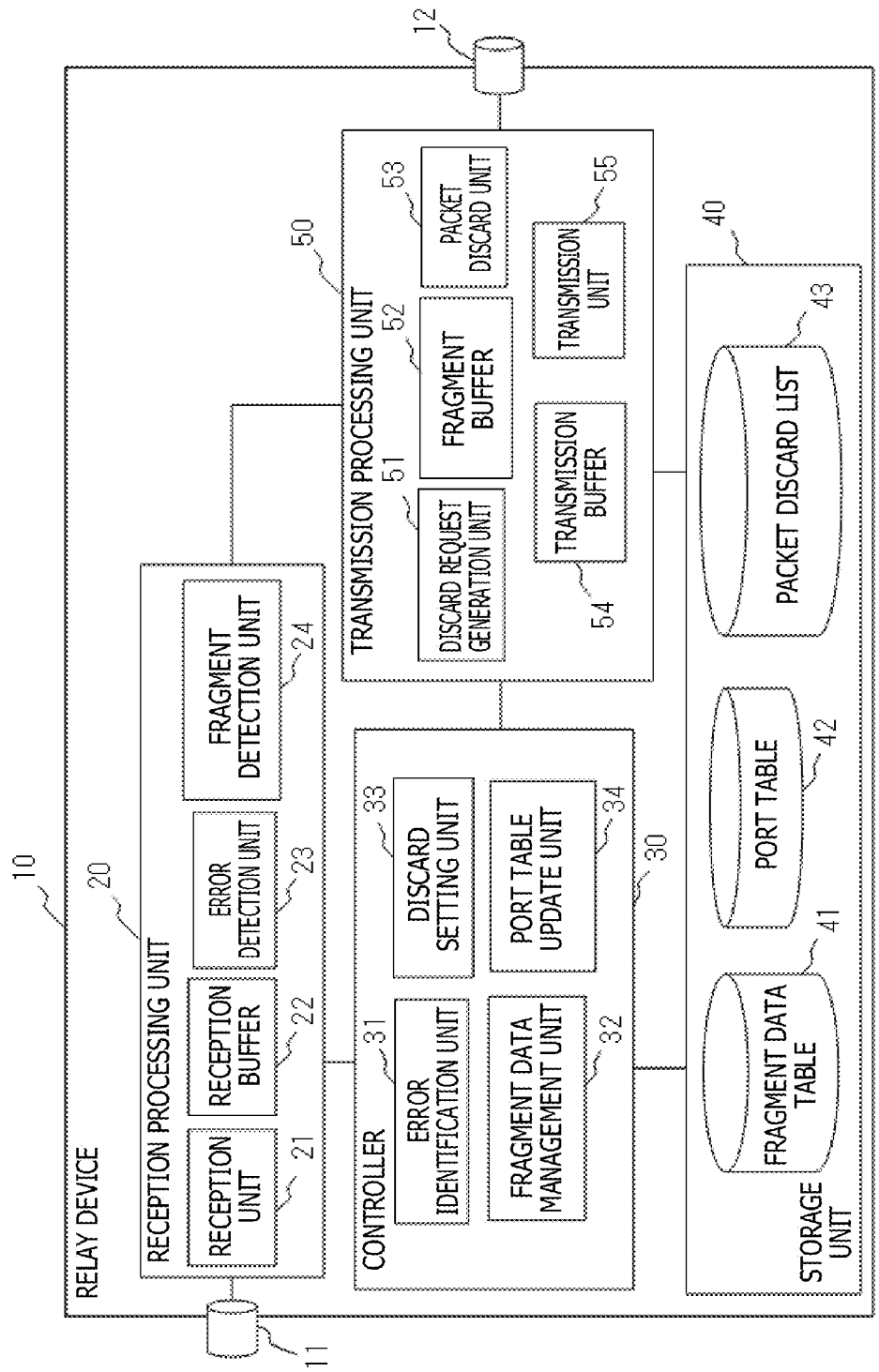
FIG. 3 is a diagram illustrating a configuration example of a relay device.

FIG. 3 is a diagram illustrating a configuration example of the relay device 10. The relay device 10 includes a port 11, a port 12, a reception processing unit 20, a controller 30, a storage unit 40, and a transmission processing unit 50. The reception processing unit 20 includes a reception unit 21, a reception buffer 22, an error detection unit 23, and a fragment detection unit 24. The controller 30 includes an error identification unit 31, a fragment data management unit 32, a discard setting unit 33, and a port table update unit 34. The storage unit 40 includes a fragment data table 41, a port table 42, and a packet discard list 43. The transmission processing unit 50 includes a discard request generation unit 51, a fragment buffer 52, a packet discard unit 53, a transmission buffer 54, and a transmission unit 55. In the example of FIG. 3, the relay device 10 includes the ports 11 and 12, but the number of ports included in the relay device 10 may be changed depending on the implementation as desired. Hereinafter, a case in which the relay device 10 receives fragment packets from the port 11 is described as an example.

The reception unit 21 receives packets from the edge node 5 or another relay device 10 via the port 11. The packet received by the reception unit 21 may be a fragment packet or a packet not fragmented. The reception unit 21 outputs a received packet to the reception buffer 22. The reception buffer 22 stores the packet inputted from the reception unit 21.

The error detection unit 23 reads the packet stored in the reception buffer 22 and determines whether an error has occurred in the packet. When an error has occurred in a received packet, the error detection unit 23 determines whether the packet used for error detection is a fragment packet. When an error is detected from a fragment packet, the error detection unit 23 outputs, to the error identification unit 31, an IP header of the packet from which the error was detected, and information indicating that the error has occurred. When the error is not detected from a packet of the processing target, the error detection unit 23 outputs the packet of the processing target to the fragment detection unit 24. Further, when data amount allowed to be transmitted within a predetermined time period for each user is restricted, the error detection unit 23 determines for each user whether communications are being performed within a restricted range of data amount. Even when a packet exceeding the restricted data amount is transmitted, the error detection unit 23 performs processing in a same manner as when a packet error is detected.

The fragment detection unit 24 determines by using a header of the inputted packet whether the inputted packet is a fragment packet. If the inputted packet is a fragment packet, the fragment detection unit 24 outputs, to the fragment data management unit 32, information contained in the IP header of the fragment packet of the processing target. Further, the fragment detection unit 24 outputs the fragment packet to the fragment buffer 52. The fragment detection unit 24 outputs the fragment packet to the fragment buffer 52 via the discard request generation unit 51. On the other hand, when the inputted packet is not a fragment packet, the fragment detection unit 24 outputs the inputted packet to the transmission buffer 54.

The error identification unit 31 extracts information such as the destination IP address, the source IP address, the packet ID, the offset value, and the IP flag from an IP header inputted from the error detection unit 23. Then, the error identification unit 31 outputs the extracted information to the fragment data management unit 32.

The fragment data management unit 32 updates the fragment data table 41 by using the information acquired from the fragment detection unit 24 or the error identification unit 31. The fragment data table 41 stores information used to transfer or discard the fragment packet. An example of the fragment data table 41 is described later. The discard setting unit 33 records the packet ID of the fragment packet of the processing target into the packet discard list 43 by referring to the fragment data table 41 as desired. An example of the packet discard list 43 is described later. The port table update unit 34 reads an address learning table used at ports provided on the relay device 10 and generates the port table 42. An example and usage of the port table 42 is described later.

The transmission processing unit 50 comprises two kinds of the buffer; the fragment buffer 52 and the transmission buffer 54. A packet stored in the transmission buffer 54 is processed with priority to a packet stored in the fragment buffer 52. The fragment buffer 52 stores the fragment packet. The transmission buffer 54 stores packets other than the fragment packet.

When the packet discard unit 53 is unable to delete a head packet of the deletion target, the discard request generation unit 51 generates a discard request for output to the transfer destination of the head packet. The discard request generation unit 51 outputs, to the transmission buffer 54, the discard request generated for the transfer destination of the head packet. Thus, the discard request is transmitted to the transfer destination of the head packet with priority to the fragment packet. Further, the discard request generation unit 51 monitors unused capacity of the fragment buffer 52. When sufficient unused capacity is available in the fragment buffer 52, the discard request generation unit 51 outputs the fragment packet inputted from the fragment detection unit 24 to the fragment buffer 52.

The packet discard unit 53 reads fragment packets including the packet ID recorded in the packet discard list 43 from the fragment buffer 52 and discards. Further, the packet discard unit 53 transmits a fragment packet not to be discarded to the transmission unit 55. The transmission unit 55 transmits, via the port 12, a fragment packet inputted from the packet discard unit 53, and a packet read from the transmission buffer.

Figure 4:
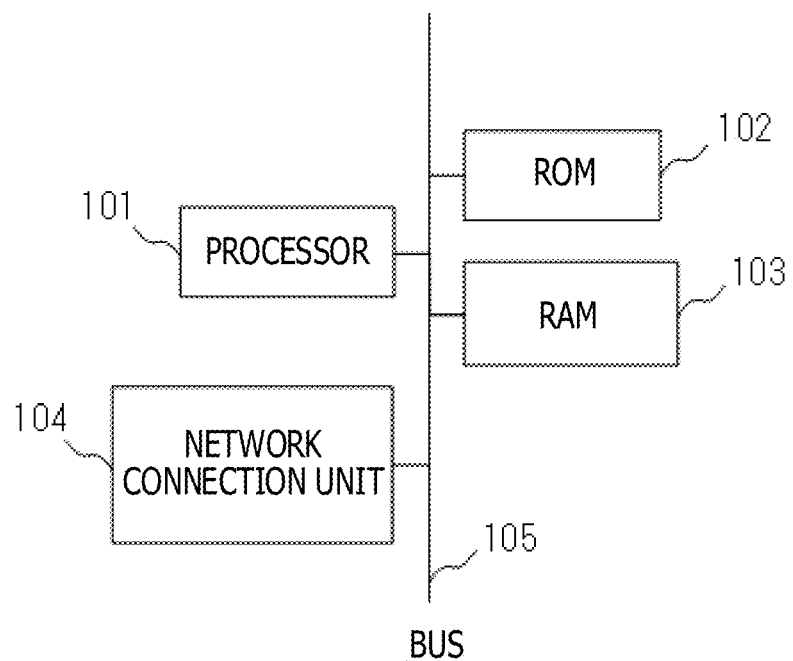
FIG. 4 is a diagram illustrating a hardware configuration example of the relay device.

FIG. 4 is a diagram illustrating a hardware configuration example of the relay device. The relay device 10 includes a processor 101, a read only memory (ROM) 102, a random access memory (RAM) 103, a network connection unit 104, and a bus 105. The processor 101 operates as the error detection unit 23, the fragment detection unit 24, the controller 30, the discard request generation unit 51, and the packet discard unit 53. The RAM 103 operates as the reception buffer 22, the storage unit 40, the fragment buffer 52, and the transmission buffer 54. The RAM 103 stores data used for processing of the processor 101, and data acquired through processing of the processor 101, as desired. The ROM 102 can store programs used for operation of the processor 101. The ROM 102 can store data used by the processor 101, and the like. Thus, the processor 101 can implement the controller 30 by executing programs stored in the ROM 102. The network connection unit 104 operates as the port 11, the port 12, the reception unit 21, and the transmission unit 55. The network connection unit 104 may include any of one or more network cards. The bus 105 connects the processor 101, the ROM 102, the RAM 103 and the network connection unit 104 to each other in such a manner that data can be input and output to each other.

First Embodiment

Hereinafter, a first embodiment is described by separating into stages comprising: generation of the fragment packet in the edge node 5, acquisition of information used for processing by the relay device 10, transfer processing, processing by the relay device which detects loss of the packet, and processing by the relay device which is informed of occurrence of a packet loss. The first embodiment is described by citing a case where an error occurs from some of fragment packets generated from a transmission packet, as an example.

Figure 5:
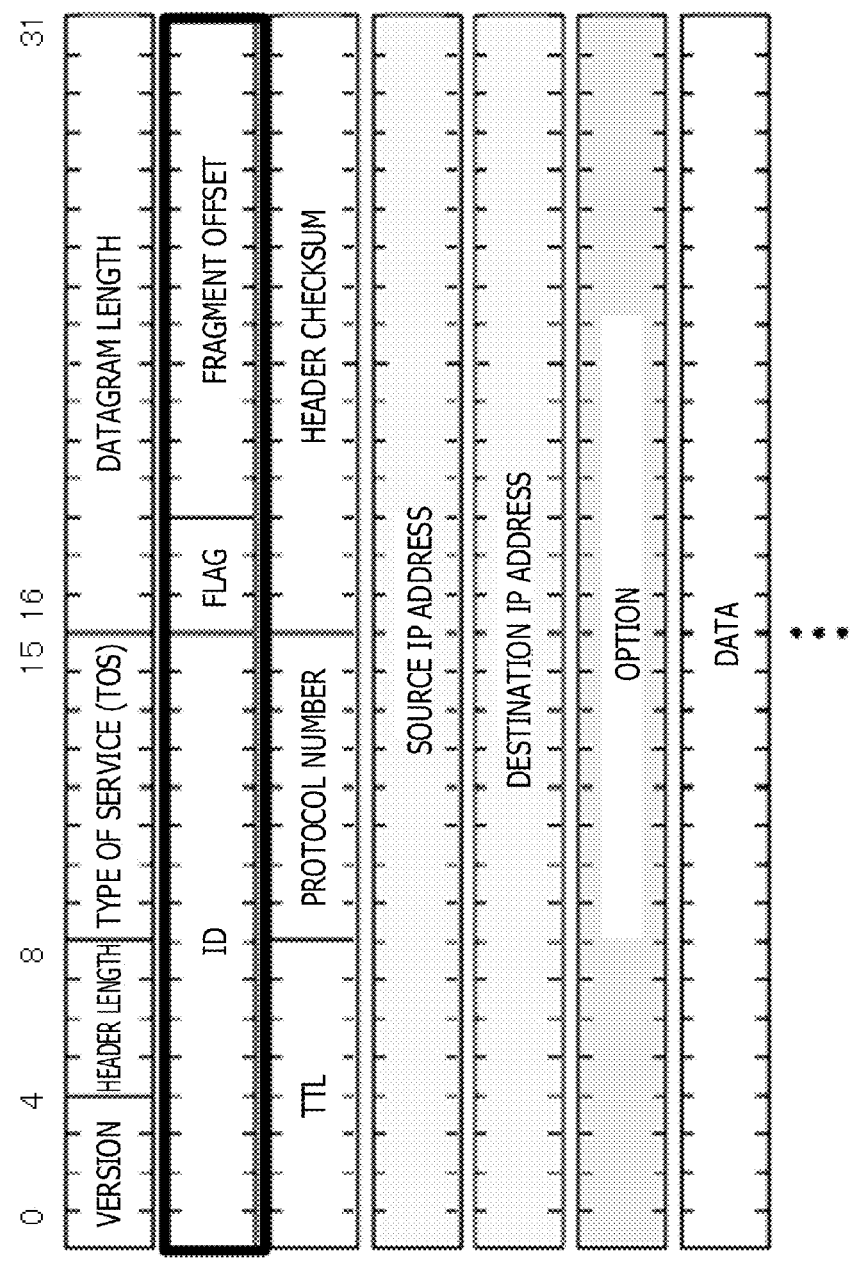
FIG. 5 is a diagram illustrating a format example of the packet.

FIG. 5 is a diagram illustrating a format example of the packet. FIG. 5 illustrates an IP header in the IP packet in detail. The IP header includes version information, header length, type of service (TOS), datagram length, packet ID, IP flag, and fragment offset. The IP header further includes time to live (TTL), protocol number, header checksum, source IP address, destination IP address, and options.

The packet ID, IP flag, and fragment offset included in the IP header is used to generate and transfer the fragment packet. The packet ID is a 16-bits value randomly generated by an application used on the user's terminal when transmitting the IP packet. The IP header of the fragment packet includes a packet ID same as a transmission packet used to generate the fragment packet. The fragment offset indicates which portion of data in an original transmission packet is held by a value of an individual fragment packet.

The IP flag is a 3-bits bit string with the second bit thereof indicating the propriety of fragmentation. The value 0 at the second bit of the IP flag indicates the fragmentation is possible. The third bit of the IP flag is information used to determine whether the packet is a last packet divided from one transmission packet. The value 0 at the third bit of the IP flag indicates that the packet is a last packet divided from one transmission packet or a packet not divided therefrom. Hereinafter, the last packet divided from one transmission packet is referred to as "last packet". On the other hand, the value 1 at the third bit of the IP flag indicates the packet is a fragment packet other than the last packet. Hereinafter, since the third bit of the IP flag is information indicating whether the packet is a last packet, the third bit of the IP flag may be referred to as "last flag". Since the second bit of the IP flag is information indicating the propriety of fragmentation, the second bit of the IP flag may be referred to as "fragmentation flag".

Figure 6:
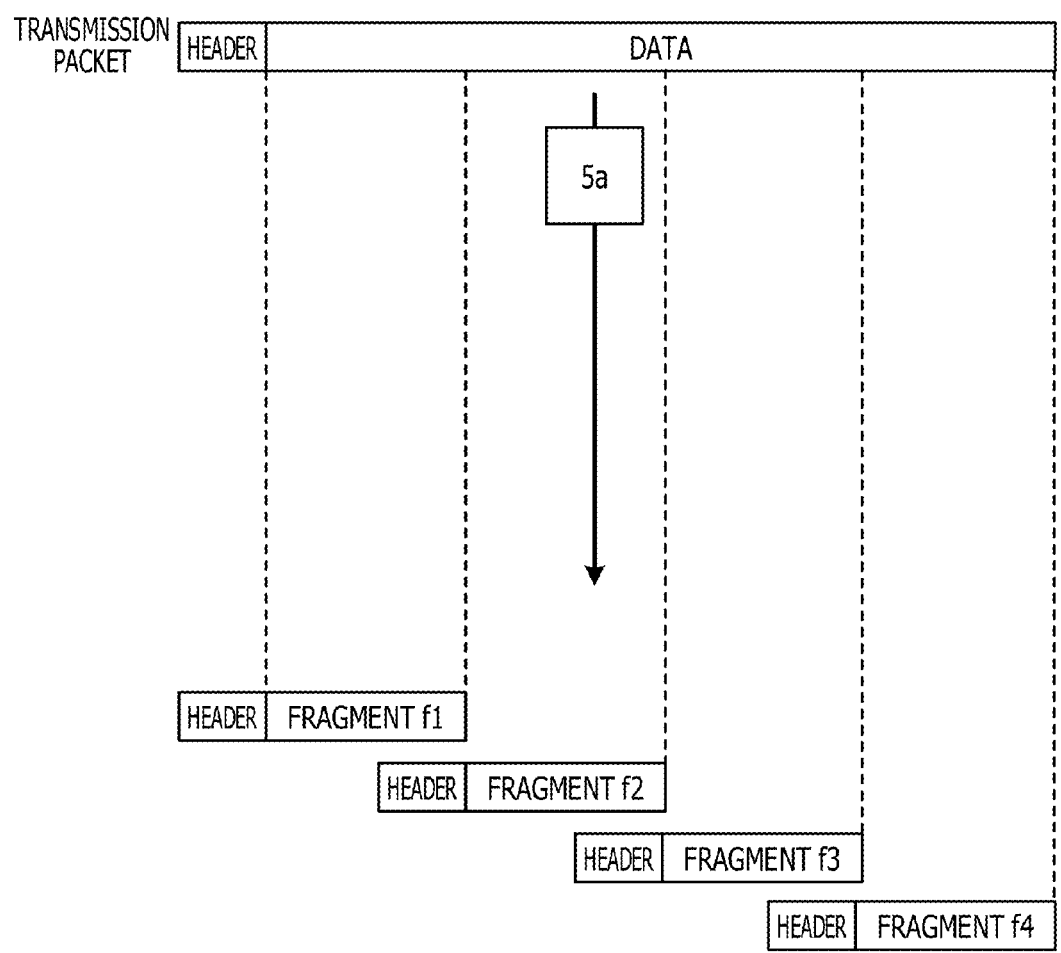
FIG. 6 is a diagram illustrating an example of a fragment packet generation method.

FIG. 6 is a diagram illustrating an example of a fragment packet generation method. Hereinafter, the transmission packet transmitted by the user A of FIG. 2 is described by citing the fragmentation by the edge node 5a, as an example.

When the value of the fragmentation flag in the IP flag of the transmission packet received from the User A is 0, the edge node 5a determines that fragmentation of the transmission packet is possible. Here, the edge node 5a is assumed to have received a transmission packet which can be fragmented. Then, the edge node 5a fragments data of the transmission packet into a predetermined size. The example of FIG. 6 illustrates that data of the transmission packet is divided into fragments f1 to f4. The edge node 5a generates fragment packets F1 to F4 by assigning an IP header to each of fragments. Here, the IP header includes same information as the transmission packet except the fragment offset and IP flag. The fragment offset indicates the byte order of a header of each of fragments in the data of transmission packet. For example, the edge node 5a sets the fragment offset to 0 for the fragment packet F1. Further, the edge node 5a sets the last flag in the IP flag to 1. For example, when the size of each of fragments is 1,000 bytes, the edge node 5a sets the fragment offset to 1000 for the fragment packet F2, 2000 for the fragment packet F3, and 3000 for the fragment packet F4. For fragment packets F2 and F3 as well, the edge node 5a sets the value of the last flag to 1 in order to indicate that the packets are not a last packet. On the other hand, for the fragment packet F4, the edge node 5a sets the value of the last flag to 1 in order to indicate that the packet is a last packet. The edge node 5a transmits generated fragment packets to the relay device 10a.

Figure 7:
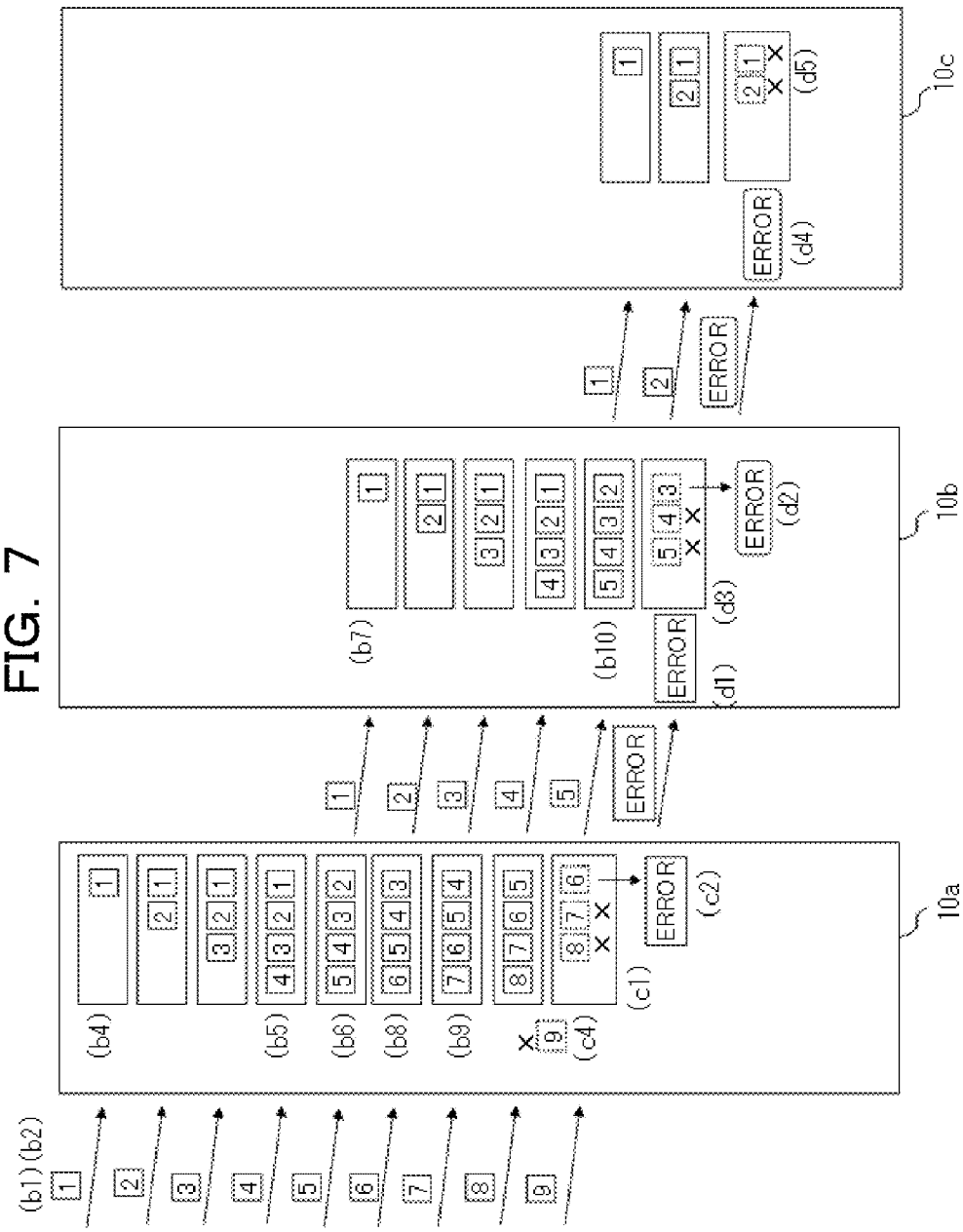
FIG. 7 is a diagram illustrating an example of relay processing.

FIG. 7 is a diagram illustrating an example of relay processing. In the example of FIG. 7, the relay device 10a receives fragment packets F1 to F9 from the edge node 5a. FIG. 7 illustrates fragment packets received by each of relay devices 10, and the change-with-time of fragment packets contained in the fragment buffer 52 of each of relay devices 10. In FIG. 7, each of fragment packets is illustrated in a square with a number of the reference numeral used to identify the fragment packet. For example, the fragment packet F1 is indicated with a square carrying the value of 1. Further, hereinafter, to make clearly understandable which relay device 10 is in processing, a last alphabetical character of the reference numeral of the relay device performing the processing may be assigned to the end of the reference numeral of the fragment packet. For example, the reception processing unit 20a indicates the reception processing unit 20 in the relay device 10a, and the packet discard unit 53b indicates the packet discard unit 53 in the relay device 10b.

(b1) A reception unit 21a of the relay device 10a receives a fragment packet F1 from the edge node 5a. The reception unit 21a outputs the fragment packet F1 to the reception buffer 22a. An error detection unit 23a reads the fragment packet F1 from the reception buffer 22a and determines whether an error has occurred in the fragment packet. Here, it is assumed that no error has occurred in the fragment packet F1. Then, the error detection unit 23a outputs the fragment packet F1 to the fragment detection unit 24a. The fragment detection unit 24a determines whether the inputted packet is a fragment packet, by referring to the fragment offset, and the fragment flag and the last flag in the IP flag of the fragment packet F1. Specifically, the fragment detection unit 24a determines that a packet not satisfying the condition of last flag=0 and fragment offset=0 is the fragment packet. The fragment packet F1 is assumed to have the fragment offset of 0, and the last flag indicating that the fragment packet F1 is not a last packet. Then, the fragment detection unit 24a determines that the inputted packet (F1) is a fragment packet.

(b2) The fragment detection unit 24a outputs information contained in the IP header of the fragment packet F1 to the fragment data management unit 32a. The fragment data management unit 32a updates the fragment data table 41a by using the inputted IP header.

FIG. 8 is a diagram illustrating an example of the fragment data table 41. The fragment data table 41 includes the packet ID, source IP address, destination IP address, fragment offset value, last flag value, and presence of error in the fragment packet. The fragment data management unit 32a stores the packet ID, source IP address, destination IP address, fragment offset value, and last flag value contained in the inputted IP header into the fragment data table 41*a*. The error detection unit 23*a* has already determined that information in the IP flag inputted from the fragment detection unit 24*a* indicates no error. Therefore, the fragment data management unit 32*a* sets the value indicating the presence of error to 0. Accordingly, information of the IP header in the fragment packet F1 is stored as illustrated in the entry No. 1 in the fragment data table 41*a*.

(b3) The port table update unit 34 generates a port table 42 for identifying the output port in the transfer processing and updates periodically. Processing of the port table update unit 34 is described later.

Figure 9:
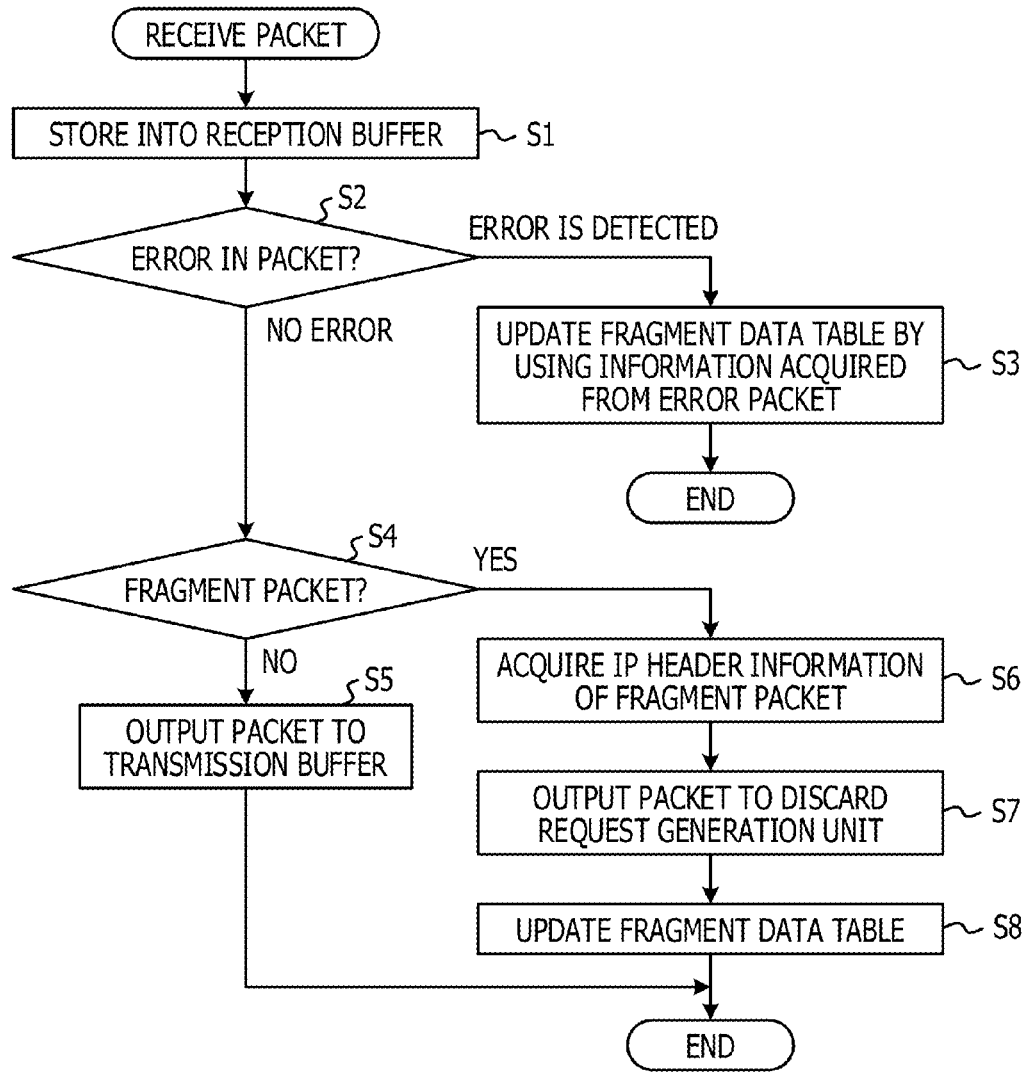
FIG. 9 is a flow chart illustrating an example of a method for acquiring data used for relay processing.

FIG. 9 is a flow chart illustrating an example of a method for acquiring data used for relay processing. Although processing of the relay device 10*a* is cited as an example of the processing described with reference to FIGS. 7 and 8, acquisition of data used for relay processing is performed similarly by any one of relay devices 10 as well. For example, the processing method may be changed, such as a change in the order between S7 and S8.

The reception buffer 22 stores the packet received by the relay device 10 (S1). The error detection unit 23 determines whether an error has occurred in the received packet (S2). If an error has occurred in the received packet, the error detection unit 23 outputs the IP header in the packet in which the error has occurred, to the error identification unit 31 (an error is detected at S2). The error identification unit 31 informs information such as the packet ID and address information contained in the inputted IP header to the fragment data management unit 32. The fragment data management unit 32 updates the fragment data table 41 based on the information acquired from the error identification unit 31 (S3). On the other hand, if no error is detected from the packet of the processing target, the error detection unit 23 outputs the packet of the processing target to the fragment detection unit 24 (no error at S2). The fragment detection unit 24 determines whether the inputted packet is a fragment packet (S4). If the inputted packet is not a fragment packet, the fragment detection unit 24 outputs the packet to the transmission buffer 54 (S5, if No at S4).

On the other hand, if the inputted packet is a fragment packet, the fragment detection unit 24 outputs information contained in the IP header to the fragment data management unit 32 (S6, if Yes at S4). Further, the fragment detection unit 24 outputs the fragment packet to the discard request generation unit 51 (S7). The fragment data management unit 32 updates the fragment data table 41 by using the information in the IP header of the fragment packet (S8).

Figure 10:
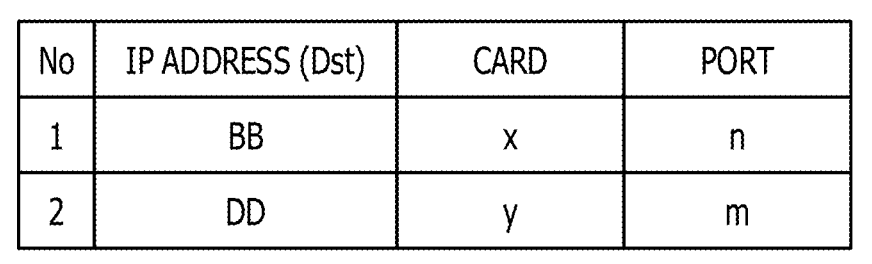

FIG. 10 is a diagram illustrating an example of the port table 42. The port table 42 records an identifier and a port number of a network card used for transmission of a packet to the destination IP address by associating with the destination IP address. The port table update unit 34 reads an address learning table used at ports periodically and updates the port table 42. The cycle at which the port table update unit 34 updates the port table 42 is determined depending on the implementation. For example, the port table update unit 34 may update the port table 42 every 500 m/sec.

Figure 11:
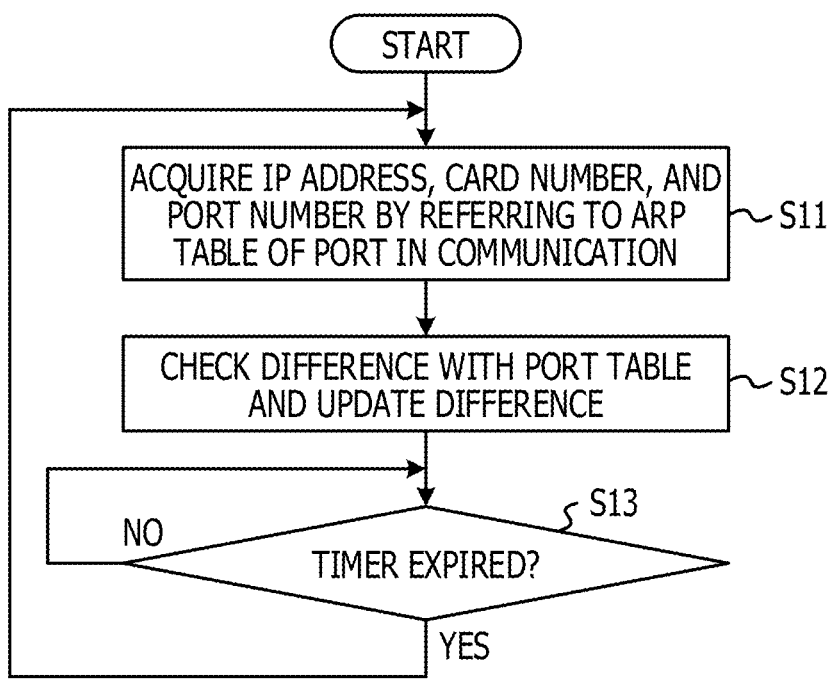
FIG. 11 is a flow chart illustrating an example of a method for generating the port table.

FIG. 11 is a flow chart illustrating an example of a method for updating the port table 42. The port table update unit 34 acquires a combination of the IP address, a network card identifier, and a port number by referring to the address resolution protocol (ARP) table of a port used for the communication (S11). The port table update unit 34 identifies a difference between the acquired information and information recorded in the port table 42, and updates the difference (S12). The port table update unit 34 determines whether the timer has expired (S13). If the timer has not expired, the port table update unit 34 waits until the timer expires (No at S13). On the other hand, if the time has expired, the port table update unit 34 initializes the timer and repeats the processing from S11 (Yes at S13).

Next, an example of processing performed subsequent to procedures (b1) to (b3) when an error-free packet is received is described with reference to FIG. 7.

(b4) The fragment detection unit 24*a* outputs the fragment packet F1 to the discard request generation unit 51*a*. The discard request generation unit 51*a* compares the unused capacity of the fragment buffer 52*a* and the size of the fragment packet F1 to each other. If the unused capacity of the fragment buffer 52*a* is larger than the size of the fragment packet F1, the discard request generation unit 51*a* determines that the fragment packet F1 can be stored in the fragment buffer 52*a*. Then, the discard request generation unit 51*a* outputs the fragment packet F1 to the fragment buffer 52*a*. Consequently, the fragment packet F1 is stored in the fragment buffer 52*a* provided with the relay device 10*a*. The packet discard unit 53*a* identifies the time when the fragment packet is stored in the fragment buffer 52*a*.

(b5) The relay device 10*a* is assumed to have received fragment packets F2 to F4 from the edge node 5*a*. Here, it is assumed that no error has occurred in any of the fragment packets F2 to F4. Then, similar processing described in procedures (b1), (b2) and (b4) is performed on each of the fragment packets F2 to F4, and thereby the fragment packets F1 to F4 are stored into the fragment buffer 52*a*.

(b6) When the relay device 10*a* receives the fragment packet F5 from the edge node 5*a*, similar processing described in procedures (b1), (b2) and (b4) are performed. Here, the packet discard unit 53*a* is assumed to read one packet from the fragment buffer 52*a* when the number of packets in the fragment buffer 52*a* matches a threshold and a new packet is inputted by the discard request generation unit 51*a*. The packet discard unit 53*a* is assumed to also acquire, from the fragment buffer 52*a*, a fragment packet stored in the fragment buffer 52*a* for a period longer than a predetermined period of time.

Hereinafter, description is made by citing a case where the threshold for starting to read the packet from the fragment buffer 52*a* is 4. Here, the fragment packets F1 to F4 are assumed to have been stored in the fragment buffer 52*a* before elapse of a predetermined time of period after the fragment packet F1 has been stored in the fragment buffer 52*a*. When the discard request generation unit 51*a* receives the fragment packet F5, the packet discard unit 53*a* reads, from the fragment buffer 52*a*, the fragment packet F1 which has been stored first in the fragment buffer 52*a*. The packet discard unit 53*a* determines whether the read packet is a discard target recorded in the packet discard list 43. Here, since no data is registered in the packet discard list 43, the packet discard unit 53*a* determines that the fragment packet F1 is not the discard target. Then, the packet discard unit 53*a* outputs the fragment packet F1 to the transmission unit 55*a*.

The transmission unit 55*a* performs transmission processing of packets stored in the transmission buffer 54*a*, and when ready for processing other packets, performs transmission processing of packets inputted from the packet discard unit 53*a*. Consequently, the fragment packet F1 is transmitted from the transmission unit 55*a* to the relay device 10*b* at the transfer destination.

On the other hand, the discard request generation unit 51*a* monitors unused capacity of the fragment buffer 52*a* appropriately. Therefore, when the fragment packet F1 is read, the discard request generation unit 51a updates the unused capacity of the fragment buffer 52a. Upon determining that the updated unused capacity is larger than the packet size of the fragment packet F5, the discard request generation unit 51a outputs the fragment packet F5 to the fragment buffer 52a. Consequently, the fragment packets F2 to F5 are stored into the fragment buffer 52a.

(b7) Upon receiving the fragment packet F1 from the relay device 10a, the relay device 10b performs similar processing as described at procedures (b1) to (b4) for the fragment packet F1 Consequently, the fragment packet F1 is stored into the fragment buffer 52b.

(b8) When the relay device 10a receives the fragment packet F6 from the edge node 5a, similar processing as described in the procedure (b6) is performed. Consequently, the fragment packet F2 is transmitted from the transmission unit 55a to the relay device 10b at the transfer destination. The fragment packets F3 to F6 are stored into the fragment buffer 52a. On the other hand, similar processing as described at the procedure (b7) is performed in the relay device 10b which has received the fragment packet F2. Consequently, the fragment packets F1 and F2 are stored into the fragment buffer 52a.

(b9) When the relay device 10a receives fragment packets F7 and F8 from the edge node 5a, similar processing as described in the procedure (b6) is performed. The fragment packets F3 and F4 are transmitted to the relay device 10b. Then, similar processing as described in the procedure (b7) is performed. Consequently, fragment packets F5 to F8 are stored into the fragment buffer 52a. And, fragment packets F1 to F4 are stored into the fragment buffer 52b.

Here, it is assumed that the fragment packet F5 is stored in the fragment buffer 52a for a time period longer than a predetermined time period, since it takes a long time until the fragment packet F8 is received after the relay device 10a has received the fragment packet F7. Then, the packet discard unit 53a reads the fragment packet F5 and outputs the fragment packet F5 to the transmission unit 55a. The transmission unit 55a transmits the fragment packets F5 to the relay device 10b.

(b10) When the relay device 10b receives the fragment packet F5, similar processing as described in the procedure (b6) is performed. Consequently, fragment packets F2 to F5 are stored into the fragment buffer 52b of the relay device 10b, and the fragment packet F1 is transferred to the relay device 10c. In the relay device 10c, the fragment packet F1 is stored into the fragment buffer 52c by similar processing as described in procedures (b1) to (b4).

A method of identifying a packet of the discard target due to loss of a packet is described by citing a case where an error has occurred in the fragment packet F9, as an example.

The reception buffer 22a of the relay device 10a acquires the fragment packet F9 via the reception unit 21a. The error detection unit 23a reads the fragment packet F9 from the reception buffer 22a and determines whether an error has occurred in the fragment packet F9. Here, it is assumed that an error has occurred in the fragment packet F9.

Figure 12:
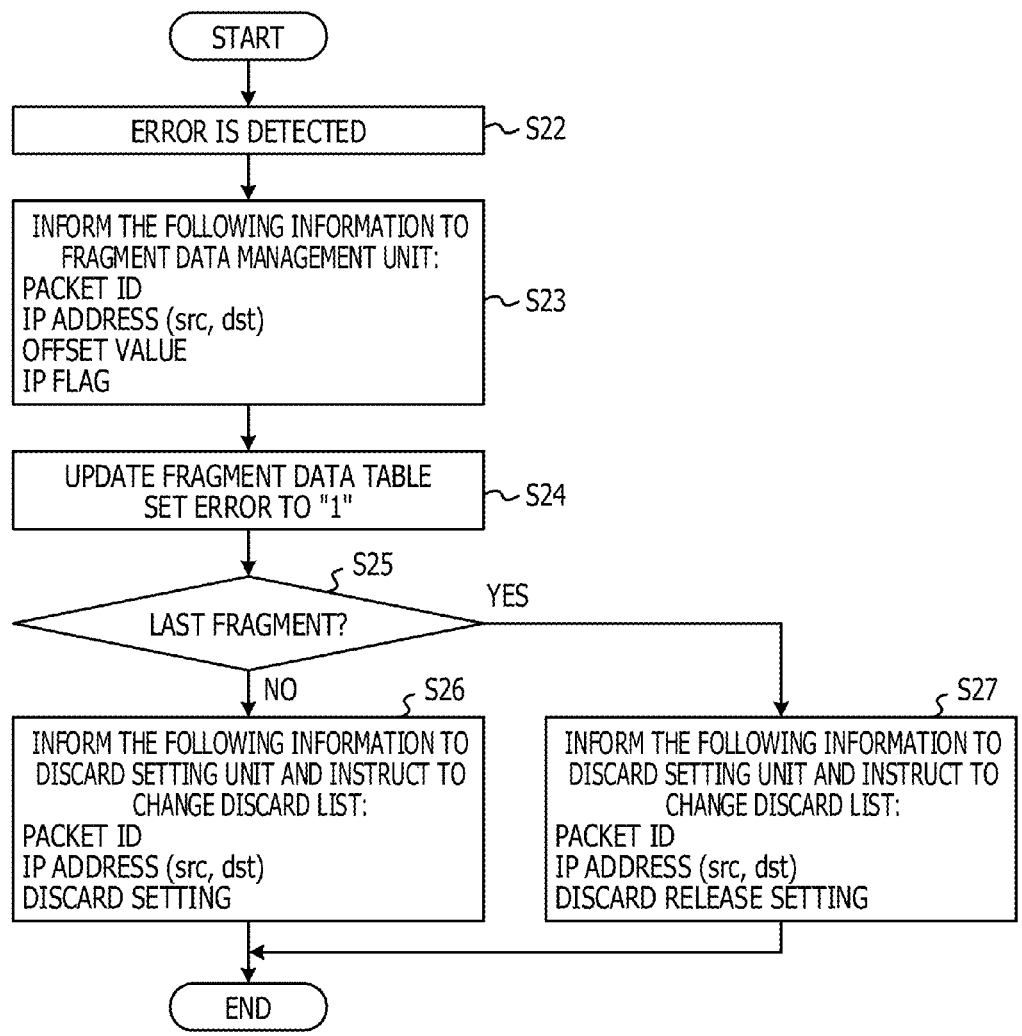
FIG. 12 is a flow chart illustrating an example of information updating due to error detection.

FIG. 12 is a flow chart illustrating an example of information updating due to error detection. An example of processing when an error is detected in a packet is described with reference to FIG. 12. The error detection unit 23a detects an error to the fragment packet F9 (S22). When a packet from which an error has been detected is a fragment packet, the error detection unit 23a outputs the IP header to the error identification unit 31a. The error identification unit 31a outputs the packet ID, source IP address, destination IP address, fragment offset value, and IP flag value from the inputted IP header to the fragment data management unit 32a (S23). The fragment data management unit 32a updates the fragment data table 41a by using the inputted information. Now, the fragment data management unit 32a sets presence of an error associated with the packet informed by the error identification unit 31a to the information indicating that an error exists. Consequently, the entry of the fragment packet F9 is represented such as, for example, No. 9 in the fragment data table 41a of FIG. 8. In the edge node 5a, the transmission packet is divided into fragment packets F1 to F9. For this reason, the value of the last flag in the fragment packet F9 is set to 0. Further, the fragment data management unit 32a determines by using the value of the last flag whether the inputted packet is a last fragment (S25). If the last flag=0, the fragment data management unit 32a determines that the inputted packet is a last packet. If the last flag=1, the fragment data management unit 32a determines that the inputted packet is not a last packet. If determined that the inputted packet is not a last packet, the fragment data management unit 32a outputs, to the discard setting unit 33a, the packet ID, source IP address, destination IP address, and discard setting signal of the packet from which the error is detected (S26, if No at S25). Here, the discard setting signal indicates that fragment packets generated from a packet same as a packet from which the error is detected are in the process of discarding, and that a packet of the discard target may be newly received.

On the other hand, if an error is detected from the last packet like the fragment packet F9, the fragment data management unit 32a outputs the discard release signal as well as the information for identifying the packet from which the error is detected, to the discard setting unit 33a (S27, if Yes at S25). Here, the information for identifying the packet from which the error is detected is a combination of the packet ID, source IP address, and destination IP address. The discard release signal is a signal requesting to release the discard setting after discarding received packets including the packet ID informed as the discard target. In other words, the discard release signal indicates that the relay device 10 does not newly receive a fragment packet generated from a packet same as the one from where the error has been detected.

Processing of the fragment packet F9 has been described above by citing a case where an error is detected in the relay device 10a, with reference to FIG. 12. However, similar processing as illustrated in FIG. 12 is performed as well when an error is detected by the other relay device 10. Information elements informed to the discard setting unit 33 at procedures S26 and S27 may be modified depending on the implementation.

FIG. 13 is a diagram illustrates an example of a packet discard list 43. The packet discard list 43 includes the packet ID contained in a packet from which an error is detected, the discard start state, and the discard state. The discard start state is information representing that a packet including an associated packet ID is the discard target in the packet discard unit 53. That is, the discard start state is information indicating that packet discarding has started. When registering a new packet ID in the packet discard list 43, the discard setting unit 33 sets the value of the discard start state to 0. The discard start state=0 indicates that discarding a packet of the discard target has not yet started. On the other hand, the discard start state=1 indicates that a packet of the discard target is in the process of discarding.

The discard state indicates whether discard processing has ended. When the value of the discard state is set to 0, discard processing has not ended since a fragment packet including the associated packet ID may be received thereafter. For this reason, even after packets stored in the fragment buffer 52 have been processed, a packet including the packet ID with the discard state=0 is monitored as a deletion target.

On the other hand, when there is no possibility of newly receiving a fragment packet including the associated packet ID, the packet discard unit 53 sets the value of the discard state to 1 after deleting packets of the discard target stored in the fragment buffer 52. The packet discard unit 53 is described in detail later. When an error is detected from the fragment packet F9, the discard setting unit 33*a* registers information in the row No. 1 of FIG. 13 into the packet discard list 43*a*.

Next, a specific example of discard processing when an error occurs in the fragment packet F9 is described with reference to the example illustrated in FIG. 7.

(c1) After updating the packet discard list 43*a*, the discard setting unit 33*a* informs the packet discard unit 53*a* that the packet discard list 43*a* has been updated. When informed that the packet discard list 43*a* has been updated, the packet discard unit 53*a* acquires, from the packet discard list 43*a*, a packet ID contained in a packet of the discard target. The packet discard unit 53*a* deletes a fragment packet including the acquired packet ID from the fragment buffer 52*a*. When the packet discard list 43*a* contains information as illustrated in FIG. 13, the packet discard unit 53*a* recognizes a packet including the packet ID of aaaa or cccc as the discard target.

(c2) Then, the discard request generation unit 51*a* determines whether the fragment offset value of the fragment packet F6 is 0. If the fragment offset value is 0, the relay device 10*a* can delete a head packet. However, since the fragment offset of the fragment packet F6 is not 0, the discard request generation unit 51*a* determines that the head packet with the packet ID=aaaa may not be deleted by the relay device 10*a*.

The discard request generation unit 51*a* generates a discard request to request the transfer destination of the head packet to discard the packet having the packet ID=aaaa. The packet requested to discard is a fragment packet determined by the discard request generation unit 51 as the processing target, with the fragment offset set to an invalid value, and the last flag=0. To disable the fragment offset, the discard request generation unit 51*a* may set, for example, all bits of the fragment offset to 1. Setting all bits of the fragment offset to 1 indicates that information beyond 65,528 bytes of data in a packet of the fragmentation target is included. However, maximum size of the data in the jumbo packet is about 9,600 bytes. Therefore, in the description below, a fragment packet having all bits of the fragment offset set to 1 is regarded as being requested to discard. In the example of FIG. 7, the discard request generation unit 51*a* sets all bits of the fragment offset of the fragment packet F6 to 1. Then, the discard request generation unit 51*a* generates the discard request by setting the last flag to 0. The discard request generation unit 51*a* outputs the generated discard request to the transmission buffer 54*a*.

Figure 14:
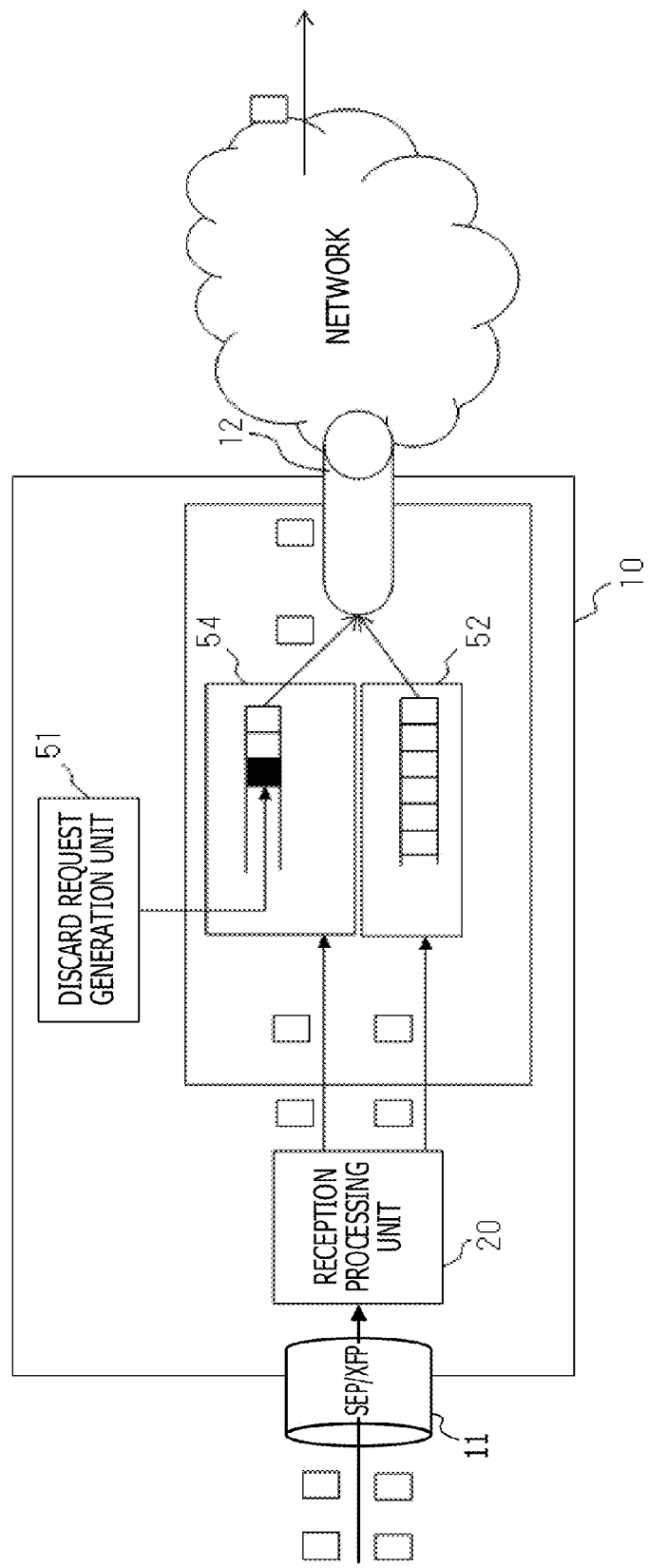
FIG. 14 is a diagram illustrating an example of a discard request transmission method.

FIG. 14 is a diagram illustrating an example of a discard request transmission method. The discard request generation unit 51*a* inserts the generated discard request into the transmission buffer 54*a*. The transmission unit 55*a* performs transmission processing of packets stored in the transmission buffer 54*a* with priority. For this reason, the discard request becomes a target of the transmission processing with priority. The transmission unit 55*a* transmits the discard request to the relay device 10*b*.

(c3) Further, the packet discard unit 53*a* reads fragment packets from the fragment buffer 52*a* and discards a packet with the packet ID of aaaa. Here, the packet discard unit 53*a* discards fragment packets F8 and F7.

(c4) Then, when the fragment packet F9 from which an error has occurred is inputted to the fragment buffer 52*a*, the packet discard unit 53*a* deletes the fragment packet F9. The packet discard unit 53*a* determines with the value of the last flag whether the packet to be deleted is a last packet. Since the fragment packet F9 is a last packet, the last flag=0. Consequently, the packet discard unit 53*a* determines that a fragment packet generated from a packet same as the one from which the error has occurred is not received any more. The packet discard unit 53*a* sets the discard state for the entry No. 1 (packet ID=aaaa) in the packet discard list 43*a* to 1. With this processing, the relay device 10*a* ends discard processing of packets with the packet ID=aaaa.

Figure 15:
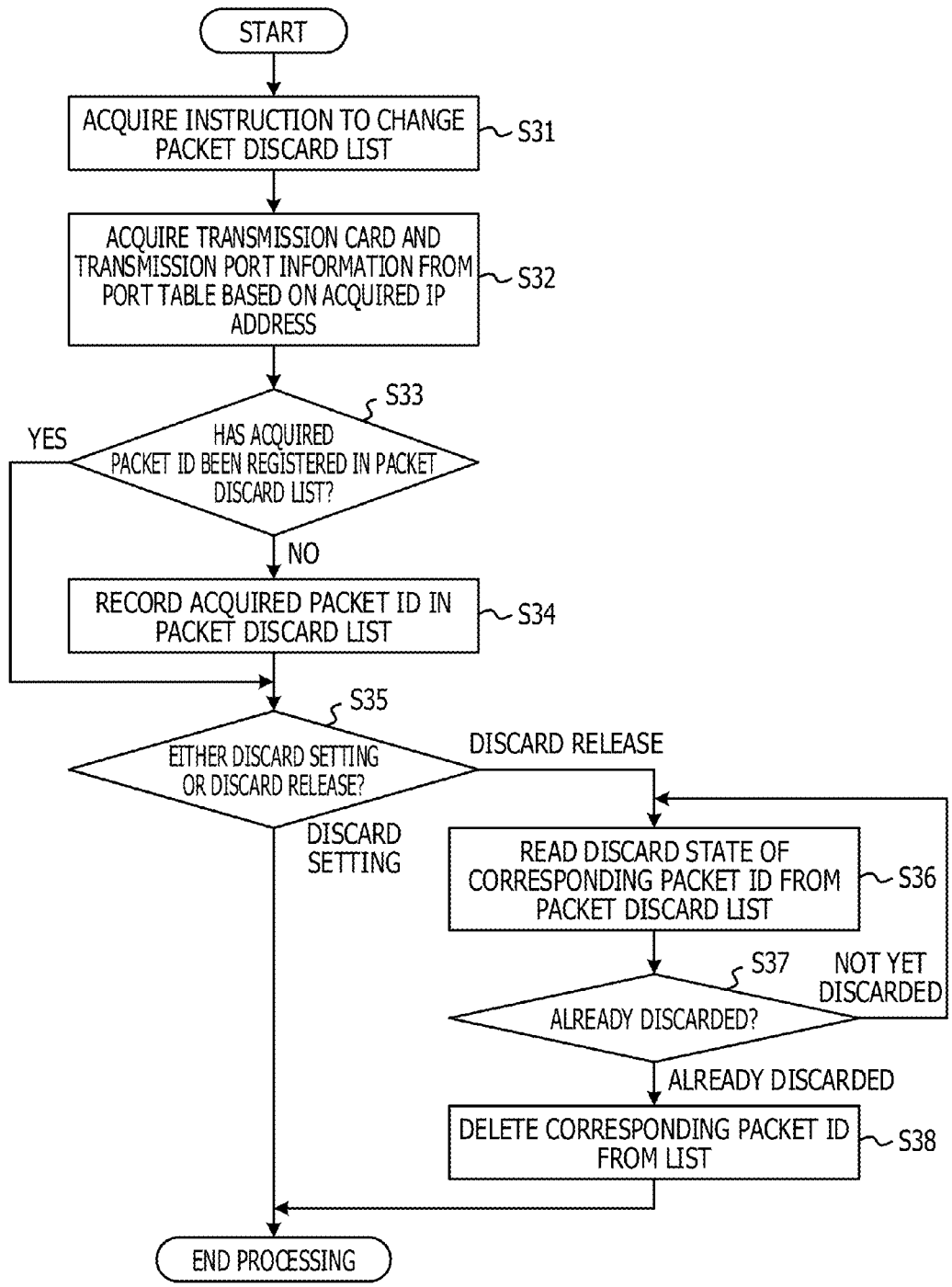
FIG. 15 is a flowchart illustrating an example of processing of a discard setting unit.

FIG. 15 is a flowchart illustrating an example of processing by a discard setting unit 33. The discard setting unit 33 acquires a instruction to change the packet discard list 43 from the fragment data management unit 32 (S31). The discard setting unit 33 acquires information of the transmission port of a packet of the discard target by using the acquired IP address and the port table 42 (S32). Further, the discard setting unit 33 determines whether the acquired packet ID has been registered in the packet discard list 43. If the acquired packet ID is not registered in the packet discard list 43, the discard setting unit 33 adds an entry for the acquired packet ID to the packet discard list 43 (S34, if No at S33). On the other hand, if the acquired packet ID has been registered in the packet discard list 43, the discard setting unit 33 does not update the packet discard list 43 (Yes at S33). Then, the discard setting unit 33 determines whether either of the discard setting signal or discard release signal is acquired from the fragment data management unit 32 (S35). If the acquired signal is the discard setting signal, the discard setting unit 33 ends processing (discard setting at S35).

When the acquired signal is the discard release signal, the discard setting unit 33 reads the value of the discard state associated with the acquired packet ID from the packet discard list 43 (S36). The discard setting unit 33 determines whether the read state indicates completion of discarding (S37). If the discard state associated with the acquired packet ID does not indicate completion of discarding, the discard setting unit 33 returns to S36 (Not discarded at S37). On the other hand, if the value of the acquired packet ID indicates completion of discarding, the discard setting unit 33 deletes the entry of the packet from the packet discard list 43 (discarded at S37). For example, when the value of the discard state is 1 (discarded) as noted in No. 2 entry of FIG. 13, the discard setting unit 33 deletes the No. 2 entry by determining that discard processing of the packet with the packet ID=bbbb has ended.

Figure 16:
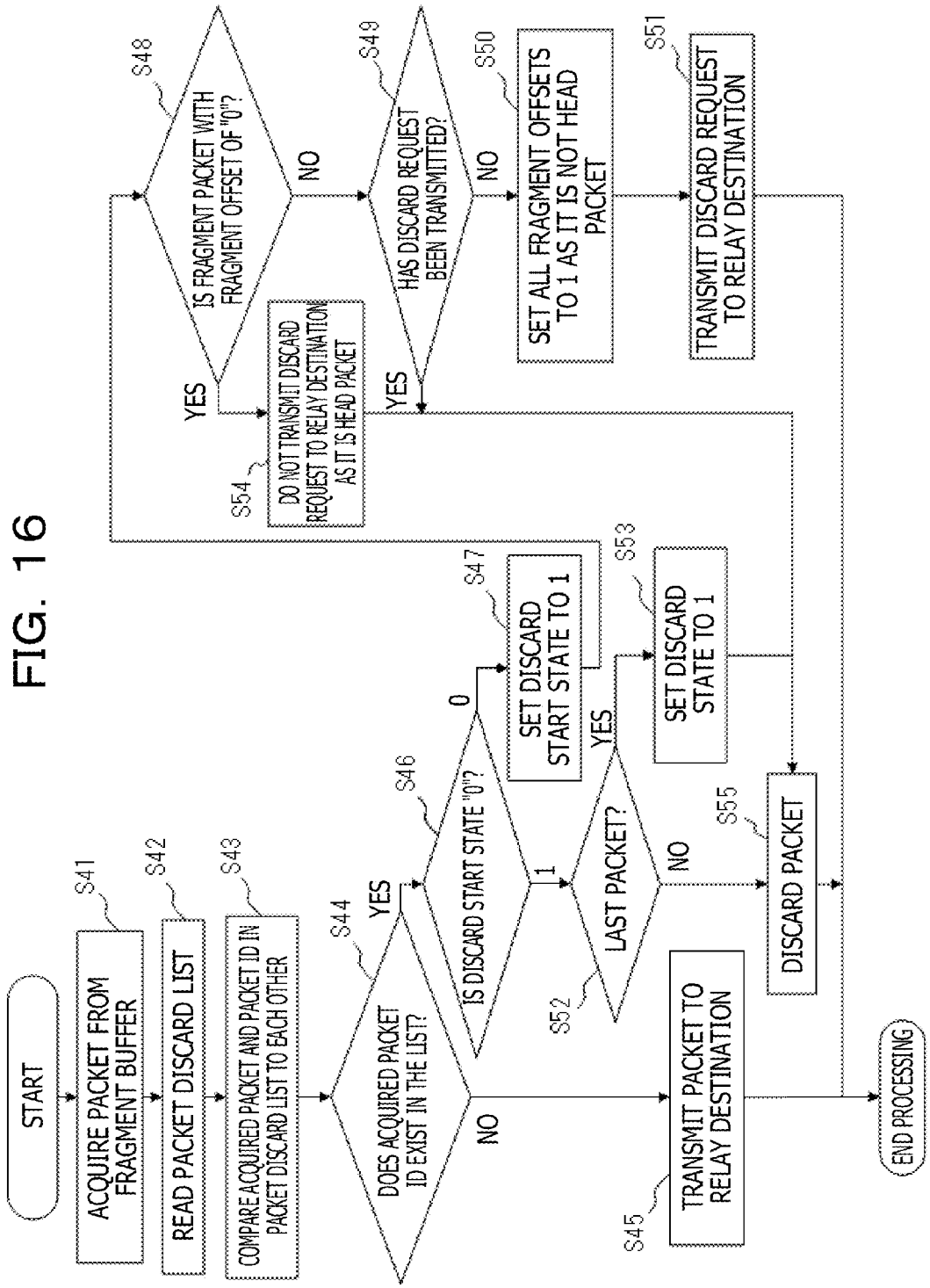
FIG. 16 is a flowchart illustrating an example of packet discard processing.

FIG. 16 is a flowchart illustrating an example of packet discard processing. The packet discard unit 53 acquires a fragment packet from the fragment buffer 52 (S41). The packet discard unit 53 reads the packet discard list 43 and compares a packet ID in the acquired packet and a packet ID set to the discard target with each other (S42, S43). The packet discard unit 53 determines whether the packet ID of the acquired packet has been set as the discard target in the packet discard list 43 (S44). If the packet ID of the acquired packet is not set as the discard target, the packet discard unit 53 transmits the acquired packet to a relay destination via the transmission unit 55 (S45, if No at S44).

If the packet ID of the acquired packet has been set as the discard target, the packet discard unit 53 determines whether the discard start state is set to 1 (S46, if Yes at S44). If the discard start state=0, the packet discard unit 53 sets the discard start state to 1 to start discarding of the packet (S47). The discard request generation unit 51 determines whether the fragment offset value in a fragment packet of the discard target is 0 (S48). When the fragment offset value is not 0, since the packet of the processing target is not a head packet, the discard request generation unit 51 determines whether a discard request for a packet having the packet ID same as the packet has been transmitted. If the discard request has not been transmitted, the discard request generation unit 51 sets all bits of the fragment offset of the read packet to 1 and generates the discard request (S50). In the discard request, the last flag is set to 0. The discard request generation unit 51 stores the discard request into the transmission buffer 54. The transmission unit 55 reads the discard request from the transmission buffer 54 and transmits the discard request to a relay device 10 at the relay destination (S51).

On the other hand, if the fragment offset value is 0, the discard request generation unit 51 does not transmit the discard request to the other relay device 10 since the packet of the processing target is a head packet (S54, if Yes at S48). Consequently, the packet discard unit 53 ends processing by discarding the read packet (S55).

If determined the discard start state=1 at S46, the packet discard unit 53 determines by using the last flag whether the read packet is a last packet (S52, if 1 at S46). If the packet of the processing target is a last packet, the packet discard unit 53 sets the discard state of an entry associated with the packet ID contained in a packet of the processing target to 1 in the packet discard list 43. Then, the packet discard unit 53 discards the packet of the processing target (S55). On the other hand, even if the packet of the processing target is not a last packet, the packet discard unit 53 discards the packet (S55, if No at S52).

Next, an example of processing by a relay device which is informed of occurrence of a packet loss is described with reference to FIG. 7.

(d1) A reception unit 21b of the relay device 10b receives the discard request from the relay device 10a. The discard request is stored in the reception buffer 22b and is read to the error detection unit 23b. By referring to the fragment offset value of the read packet, the error detection unit 23b determines whether the discard request is received. Here, the discard request generated in the procedure (c2) becomes a processing target of the error detection unit 23b. Upon determining that the packet of the processing target is requested to be discarded, the error detection unit 23b outputs the IP header of the discard request to the error identification unit 31b in a same manner as when an error is detected. Processing subsequent to output of the IP header of the discard request to the error identification unit 31b is same as processing at S23 to S27 described with reference to FIG. 12. Thus, the fragment data table 41b after receipt of the discard request turns as illustrated in FIG. 8. Further, the packet discard list 43b is also updated by procedures described with reference to FIGS. 12 and 13. Consequently, the packet discard unit 53c recognizes a packet with the packet ID of aaaa as the discard target. In the example of FIG. 7, the fragment packet F2 is transferred to the relay device 10c during processing of the discard request.

(d2) Then, the discard request generation unit 51b reads the fragment packet F3 from the fragment buffer 52b and determines whether the fragment offset value is 0. The fragment offset value of the fragment packet F3 is not 0. Therefore, the discard request generation unit 51b generates the discard request and transmits to the relay device 10c through similar processing as described in the procedure (c2) with reference to FIG. 14.

The packet discard unit 53b reads fragment packets F4 and F5 from the fragment buffer 52b and discards. Processing performed for discarding the fragment packet is same as processing described with reference to FIGS. 15 and 16.

(d4) A reception buffer 22c of the relay device 10c receives the discard request from the relay device 10b via the reception unit 21c. From the fragment offset value of the read packet, the error detection unit 23c determines that the discard request is received. The error detection unit 23c outputs the IP header of the discard request to an error identification unit 31c. Subsequent processing is same as the processing described with reference to S23 to S27 in FIG. 12, and FIG. 13. Consequently, the packet discard unit 53c determines that a packet with the packet ID of aaaa as the discard target.

(d5) Upon reading the fragment packet F1 stored at a head of the fragment buffer 52c, the discard request generation unit 51c determines whether the fragment offset value is 0. The fragment offset value of the fragment packet F1 is not 0. Therefore, the discard request generation unit 51c determines that a head packet can be discarded by the relay device 10c, and does not generate the discard request. The packet discard unit 53c deletes the fragment packets F1 and F2.

Thus, fragment packets generated from a transmission packet including a fragment packet from which the error has been detected are discarded by a relay device 10 which holds such fragment packets. For this reason, fragment packets are not discarded due to failure of restoring the transmission packet from being transferred to the edge node 5 which restores the transmission packet. Accordingly, the method according to this embodiment can suppress transmission and reception of packets of the discard target to the minimum, and thereby improve the communication efficiency.

Second Embodiment

The second embodiment is described by citing a case where a tail drop occurs when a relay device 10 receives the fragment packet beyond the capacity of the fragment buffer 52. Even when the tail drop has occurred, transfer processing of a useless packet which is not usable for restoration of the transmission packet can be reduced in a similar way as when a packet error has occurred.

Figure 17:
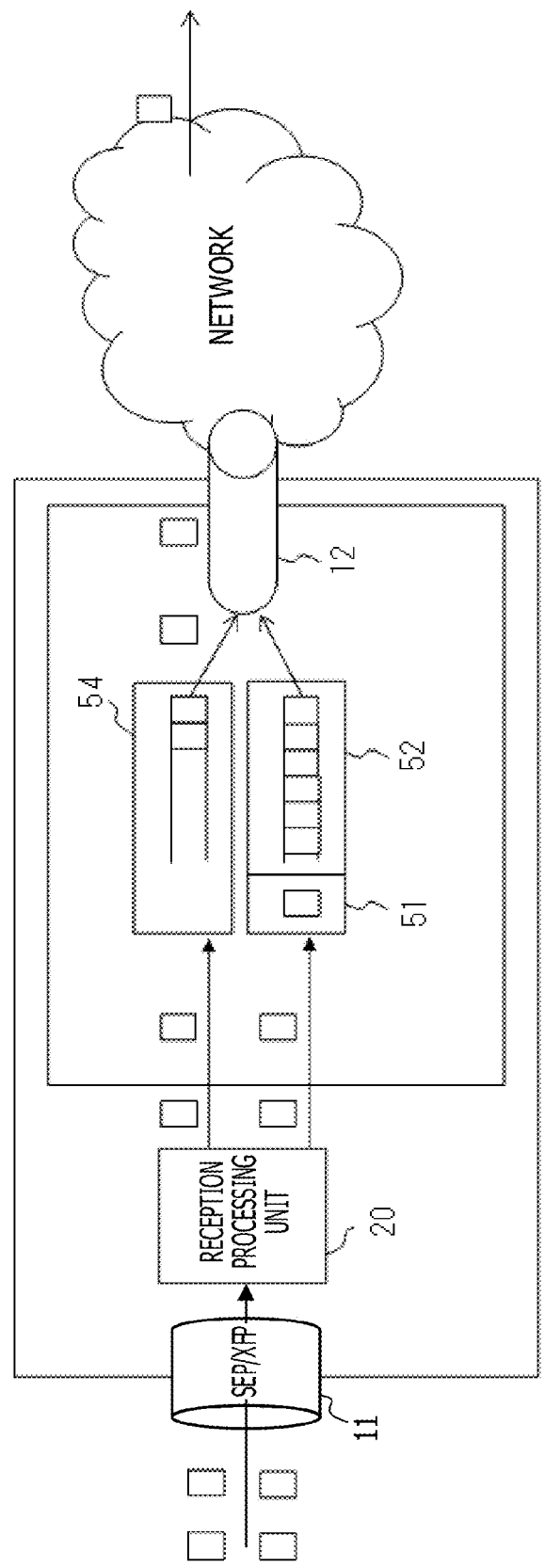
FIG. 17 is a diagram illustrating an example of a tail drop detection method.

FIG. 17 is a diagram illustrating an example of a tail drop detection method. Also in the second embodiment, processing performed by the reception processing unit 20 and the controller 30, and the update method of the fragment data table 41, the port table 42, and the packet discard list 43 are same as the first embodiment. When the unused capacity of the fragment buffer 52 falls below the capacity of a fragment packet to be newly stored, the discard request generation unit 51 determines that a tail drop has occurred.

Figure 18A:
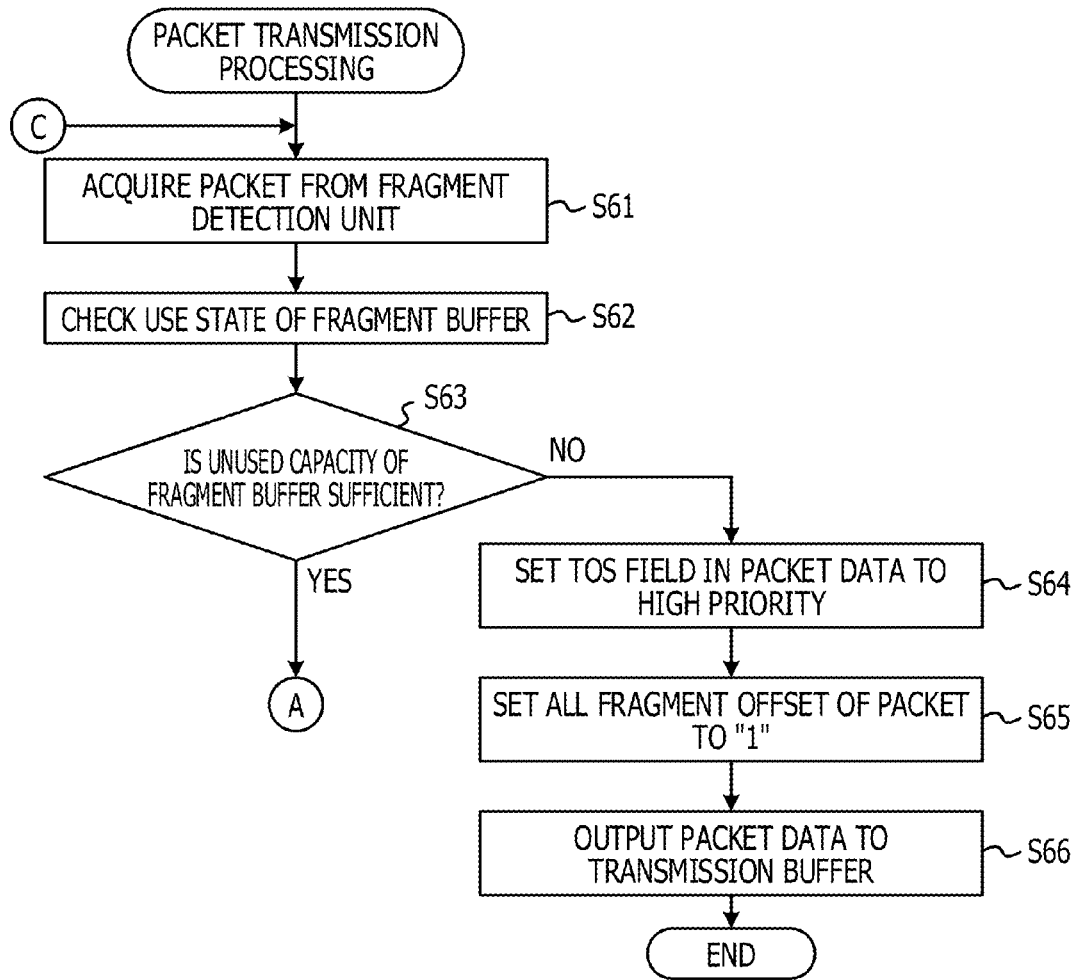
FIG. 18A is a flow chart illustrating an operation example of a transmission processing unit in accordance with a second embodiment.

FIG. 18A and FIG. 18B are flow charts illustrating an operation example of the transmission processing unit 50 according to the second embodiment. The discard request generation unit 51 acquires a fragment packet from the fragment detection unit 24 (S61). The discard request generation unit 51 checks use status of the fragment buffer 52 (S62). The discard request generation unit 51 determines whether the fragment buffer 52 has sufficient unused capacity to store the acquired fragment packets (S63). If the sufficient unused capacity is not available, the discard request generation unit 51 sets the value in the TOS field of the read packet to high priority (S64, if "No" at S63). The discard request generation unit 51 sets all bits of the fragment offset of the packet to 1 and generates the discard request (S65). The discard request generation unit 51 outputs the discard request to the transmission buffer 54, and transmits the discard request to the transfer destination of the head packet via the transmission unit 55 (S66).

On the other hand, when there remains unused capacity in the fragment buffer 52, the discard request generation unit 51 outputs the acquired fragment packet to the fragment buffer 52 (Yes at S63). The fragment buffer 52 stores packets inputted from the discard request generation unit 51 (S67). By using the size of packets newly stored, the discard request generation unit 51 calculates the unused capacity of the fragment buffer 52 after storing the packets (S68, S69). If the unused capacity of the fragment buffer 52 exceeds the threshold value, the discard request generation unit 51 determines that the fragment buffer 52 has sufficient unused capacity, and repeats processing from S61 (yes at S70). Here, the threshold value is a value indicating high possibility of successfully storing the fragment packets. The threshold value can be set depending on the implementation such as, for example, to average size of fragment packets and the size of packets acquired at S68.

On the other hand, if the unused capacity of the fragment buffer 52 falls below the threshold value, the discard request generation unit 51 informs the packet discard unit 53 that the unused capacity of the fragment buffer 52 is insufficient (No at S70). The packet discard unit 53 recognizes that the fragment buffer 52 has not sufficient unused buffer capacity (S71). Hereinafter, a state where the unused capacity of the fragment buffer 52 is insufficient may be referred to as "buffer full". The packet discard unit 53 forcibly reads packets from the fragment buffer 52 and outputs to the transmission unit 55 and thereby performs transfer processing of the packets (S72, S73). After forcibly transmitting the packets, the packet discard unit 53 releases the buffer full state and initializes the read timer (S74, S75). Here, the read timer is a timer which triggers the packet discard unit 53 to forcibly read packets. The packet discard unit 53 starts the read timer and waits until the read timer expires (S76, if No at S77). After the read timer has expired, the packet discard unit 53 reads packets from the fragment buffer 52 and transfers to a relay destination via the transmission unit 55 (S78, S79, if Yes at S77). Then, the packet discard unit 53 initializes the read timer and determines whether a next packet has been outputted to the discard request generation unit 51 by the fragment detection unit 24 (S80, S81). If the next packet has been outputted to the discard request generation unit 51 by the fragment detection unit 24, processing following the step S61 is repeated (Yes at S81). On the other hand, if the next packet is not outputted to the discard request generation unit 51 by the fragment detection unit 24, processing following the step S76 is repeated (No at S81)

A relay device 10, which receives, through processing described with reference to FIGS. 17 and 18, a fragment packet from a relay device 10 in which a tail drop has occurred, can identify the packet ID of the packet which becomes a discard target due to the tail drop. Consequently, the relay device 10, which has received a fragment packet from a relay device 10 in which the tail drop has occurred, can discard the packet of the discard target through similar processing as described in the context of the first embodiment. According to the second embodiment, possibility that a pallet of the discard target may be newly transmitted can be informed to a relay device 10 at the transmission destination of the discard request by setting the last flag contained in the discard request to 1. Accordingly, by using the second embodiment, drop of the communication efficiency due to transfer processing of a fragment packet of the discard target can be averted even when loss of a fragment packet due to a tail drop has occurred.

Modified Example

Embodiments are not limited to the above, but various modifications are possible. Some of the examples are described below.

Figure 20:
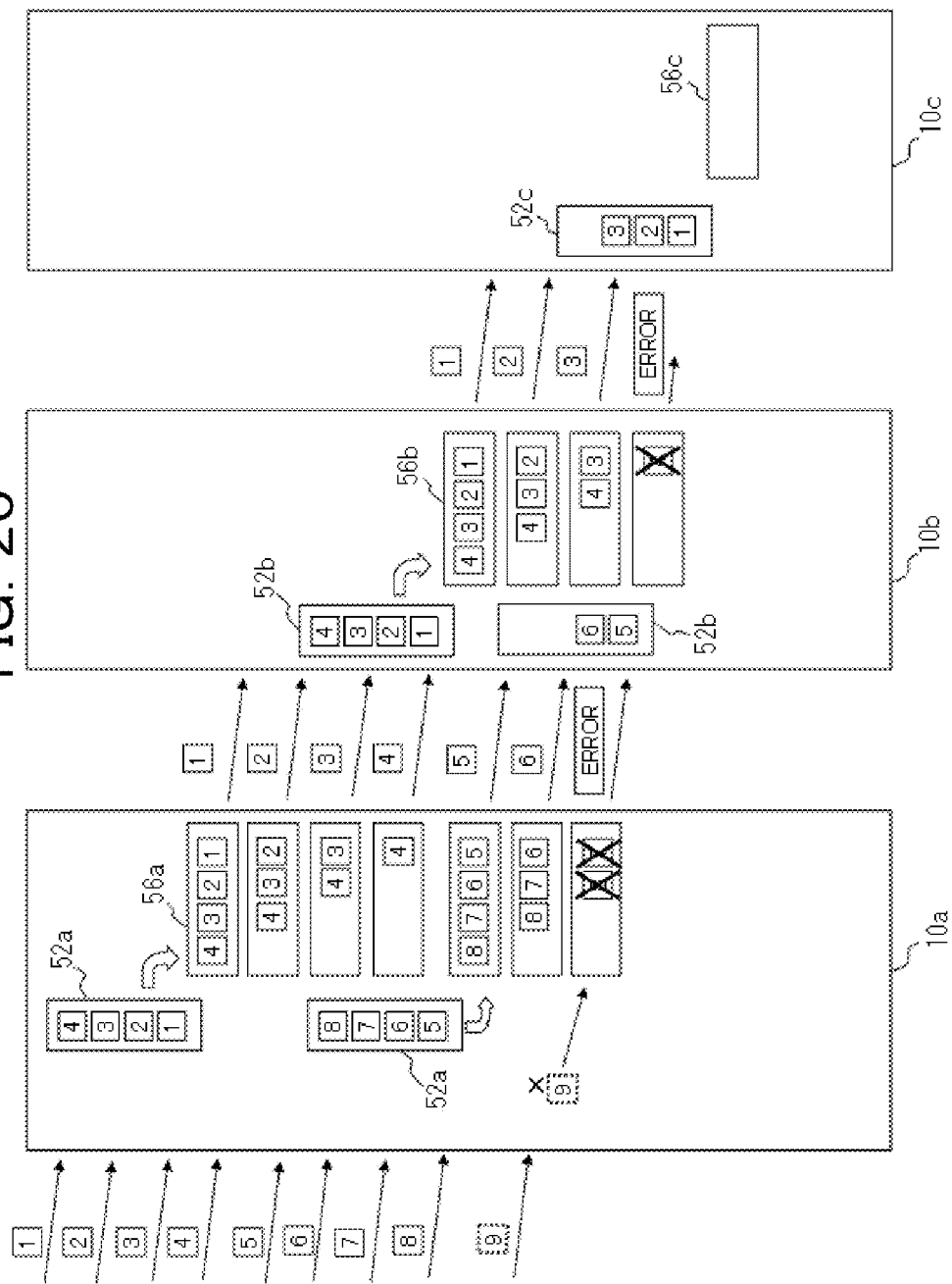
FIG. 20 is a diagram illustrating an example of processing in accordance with the modified example.

The relay device 10 may include a fragment transmission buffer 56 in addition to the fragment buffer 52. When a predetermined number of packets are stored in the fragment buffer 52 or when the storage period of fragment packets in the fragment buffer 52 exceeds a predetermined time period, all packets in the fragment buffer 52 are outputted to the fragment transmission buffer 56. An example of a combination use of the fragment buffer 52 and the fragment transmission buffer 56 is described with reference to FIGS. 19 to 21. Even in the example illustrated with FIGS. 19 to 21, it is assumed that fragment packets F1 to F9 generated from one transmission packet are transmitted from the edge node 5*a* to the relay device 10*a*, similarly with a case described with reference to FIG. 7. For easy comparison with FIG. 7, the example illustrated in FIGS. 19 to 21 is described by citing a case where an error has occurred in the fragment packet F9, as an example.

The fragment packets F1 to F4 are processed in the same manner as procedures (b1) to (b5). Thus, the fragment packets F1 to F4 are in the fragment buffer 52*a* of the relay device 10*a*. When the number of packets stored in the fragment buffer 52*a* matches a threshold value, all fragment packets in the fragment buffer 52*a* are outputted to the fragment transmission buffer 56*a* as illustrated in FIG. 19. In the example of FIG. 19, the threshold value is 4.

The packet discard unit 53*a* reads fragment packets in the fragment transmission buffer 56*a* one by one every specific time. When the packet ID in the read fragment packet is not recorded as a discard target in the packet discard list 43*a*, the packet discard unit 53*a* outputs the read packet to the transmission unit 55*a*. For this reason, when the packet ID of these packets is not recorded as the discard target during processing, fragment packets F1 to F4 are transferred to the relay device 10*b* as illustrated in FIG. 19.

Assuming that the relay device 10*a* has received the fragment packets F5 to F8 during transfer of fragment packets F1 to F4, fragment packets F5 to F8 are outputted to the fragment transmission buffer 56*a* as well by the similar processing. As the packet discard unit 53*a* outputs fragment packets F5 and F6 to the transmission unit 55*a*, these packets are also transferred to the relay device 10*b*. The similar processing as in the relay device 10*a* is performed by the relay device 10*b*.

Then, when the relay device 10*a* receives the fragment packet F9, the packet discard unit 53*a* recognizes a packet with the packet ID=aaaa as a discard target by the processing of the procedure (c1) described with reference to FIG. 7. Then, the packet discard unit 53*a* deletes fragment packets F7 to F9 by the similar processing as procedures (c3) and (c4). Further, the discard request generation unit 51*a* generates a discard request by using the fragment packet F7 in the same procedure as (c2) and transmits to the relay device 10*b* via the transmission unit 55*a*.

FIG. 20 illustrates an example where the relay device 10*b* receives a discard request. When the relay device 10*b* receives a discard request, the packet discard unit 53*b* recognizes the packet with the packet ID=aaaa as the discard target through similar processing as the step (d1). Then, the packet discard unit 53b discards the fragment packet F4 without transferring. The discard request generation unit 51b generates the discard request by using the fragment packet F4 and transmits to the relay device 10c.

FIG. 21 illustrates an example of processing performed by relay devices 10b and 10c following the processing described with reference to FIG. 20. In the relay device 10b, when storage time of the packet F5 in the fragment buffer 52b reaches a predetermined value, fragment packets F5 and F6 are read by the fragment transmission buffer 56b. The packet discard unit 53b discards fragment packets F5 and F6 in the fragment transmission buffer 56b. On the other hand, in the relay device 10c as well, the packet discard unit 53c recognizes the packet ID=aaaa as the discard target through similar processing as the step (d4). Then, when storage time of the fragment packet F1 in the fragment buffer 52c reaches a predetermined value, fragment packets F1 to F3 are read from the fragment buffer 52c to the fragment transmission buffer 56c. The packet discard unit 53c discards fragment packets F1 and F3 in the fragment transmission buffer 56c.

The fragment data table 41, the port table 42, and the packet discard list 43 referred to in the above description are examples, and information elements contained in the tables may be modified depending on the implementation.

The second embodiment may be modified such that the discard processing of the fragment packet is also performed in a relay device 10 where a tail drop has occurred. For example, assume that a tail drop has occurred in the relay device 10a due to lack of the unused capacity of the fragment buffer 52a, and thereby a packet with the packet ID=bbbb becomes the discard target. Then, the discard request generation unit 51a transmits a discard target and informs the packet ID contained in the packet of the discard target to the packet discard unit 53a, as appropriate. The packet discard unit 53a identifies the packet ID informed by the discard request generation unit 51a as the discard target similarly with packet IDs recorded in the packet discard list 43 as the discard target. Consequently, the packet discard unit 53a can suppress transfer of packets of the discard target among fragment buffers stored in the fragment buffer 52a.

The first embodiment and the second embodiment can be combined together. The first embodiment and a modified example of the second example may be combined together. By combining multiple embodiments together, a useless packet is not transferred and thereby communication efficiency can be improved, even when a fragment packet is lost due to occurrence of an error or when a packet is lost due to a tail drop.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication method executed by a processor included in a relay device, the communication method comprising:
receiving a target packet among a plurality of segmented packets generated by dividing a transmission packet, the plurality of segmented packets including a same identifier as that of the transmission packet;
storing the target packet into a memory by the storing when no error is detected from the target packet among the plurality of segmented packets;
discarding one or more packets stored in the memory and including a same identifier as that of the target packet when an error is detected from the target packet;
generating a discard request including an identifier of the transmission packet, and information requesting to discard a packet including the identifier, when the discarded one or more packets do not include a head packet among the plurality of segmented packets; and
transmitting the discard request to a transmission destination to which the head packet is transmitted.

2. The communication method according to claim 1, further comprising:
setting an identifier contained in the target packet as an identifier of a discard target when an error is detected from the target packet; and
excluding the stored identifier from an identifier of the discard target, when a last packet indicating a rearmost packet among the plurality of segmented packets is discarded.

3. The communication method according to claim 1, further comprising:
generating the discard request, and transmitting the discard request to the transmission destination, when the memory does not have sufficient unused capacity to store the target packet.

4. The communication method according to claim 3, further comprising:
estimating unused capacity of the memory after storing the target packet into the memory, by using a capacity of the target packet, when the memory has sufficient unused capacity to store the target packet, and
generating the discard request when the unused capacity does not exceed a predetermined threshold value.

5. The communication method according to claim 1, wherein the discarding includes, when an identifier contained in segmented packets read from the memory matches an identifier contained in the target packet, discarding the read segmented packets.

6. The communication method according to claim 1, wherein the generating includes determining that the discarded one or more packets do not include the head packet, when any of the discarded one or more packets do not contain head data of the transmission packet.

7. The communication method according to claim 1, wherein
the generating includes outputting the discard request to a transmission buffer holding a priority packet to be transmitted to the transmission destination with priority to a packet stored in the memory, and
the transmitting includes transmitting the discard request from the transmission buffer to the transmission destination.

8. The communication method according to claim 1, wherein the discarding includes:
determining for each user whether communications are being performed within a restricted range of data amount, when data amount allowed to be transmitted within a predetermined time period for each user is restricted; and
determining that an error is detected in the target packet, when the target packet exceeds the restricted data amount.

9. A relay device comprising:
a memory, and
a processor coupled to the memory and configured to:
receive a target packet among a plurality of segmented packets generated by dividing a transmission packet, the plurality of segmented packets including a same identifier as that of the transmission packet;
store the target packet into a memory when no error is detected from the target packet among the plurality of segmented packets;
discard one or more packets stored in the memory and including a same identifier as that of the target packet when an error is detected from the target packet;
generate a discard request including an identifier of the transmission packet, and information requesting to discard a packet including the identifier, when the discarded one or more packets does not include a head packet among the plurality of segmented packets; and
transmit the discard request to a transmission destination to which the head packet is transmitted.

10. The relay device according to claim 9, wherein the processor is further configured to:
set an identifier contained in the target packet as an identifier of a discard target when an error is detected from the target packet; and
exclude the stored identifier from an identifier of the discard target, when a last packet indicating a rearmost packet among the plurality of segmented packets is discarded.

11. The relay device according to claim 9, wherein the processor is further configured to generate the discard request, and transmitting the discard request to the transmission destination, when the memory does not have sufficient unused capacity to store the target packet.

12. The relay device according to claim 11, wherein the processor is further configured to:
estimate unused capacity of the memory after storing the target packet into the memory, by using a capacity of the target packet, when the memory has sufficient unused capacity to store the target packet, and generate the discard request when the unused capacity does not exceed a predetermined threshold value.

13. A communication system comprising:
a first communication device configured to receive a transmission packet from a transmission source, and divide the transmission packet into a plurality of segmented packets;
a second communication device configured to restore the transmission packet by using the plurality of segmented packets; and
a relay device configured to transmit segmented packets received from the first communication device to the second communication device,
wherein the relay device is configured to:
receive a target packet among the plurality of segmented packets, the plurality of segmented packets including a same identifier as that of the transmission packet;
store the target packet into a memory when no error is detected from a target packet among the plurality of segmented packets;
discard one or more packets stored in the memory and including a same identifier as that of the target packet when an error is detected from the target packet;
generate a discard request including an identifier of the transmission packet, and information requesting to discard a packet including the identifier, when the discarded one or more packets does not include a head packet among the plurality of segmented packets; and
transmit the discard request to a transmission destination to which the head packet is transmitted.

14. The communication system according to claim 13, wherein the relay device is further configured to:
set an identifier contained in the target packet as an identifier of a discard target when an error is detected from the target packet; and
exclude the stored identifier from an identifier of the discard target, when a last packet indicating a rearmost packet among the plurality of segmented packets is discarded.

* * * * *